United States Patent
Hirschmann et al.

(10) Patent No.: US 10,047,292 B2
(45) Date of Patent: Aug. 14, 2018

(54) LIQUID-CRYSTALLINE MEDIUM

(75) Inventors: Harald Hirschmann, Darmstadt (DE); Sabine Schoen, Herten (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 13/994,237

(22) PCT Filed: Nov. 17, 2011

(86) PCT No.: PCT/EP2011/005807
§ 371 (c)(1),
(2), (4) Date: Jun. 14, 2013

(87) PCT Pub. No.: WO2012/079676
PCT Pub. Date: Jun. 21, 2012

(65) Prior Publication Data
US 2013/0256596 A1    Oct. 3, 2013

(30) Foreign Application Priority Data
Dec. 17, 2010    (DE) .................. 10 2010 054 987

(51) Int. Cl.
*G02F 1/1333*  (2006.01)
*C09K 19/34*  (2006.01)
*C09K 19/20*  (2006.01)
*C09K 19/42*  (2006.01)
*C09K 19/04*  (2006.01)

(52) U.S. Cl.
CPC .......... *C09K 19/3402* (2013.01); *C09K 19/20* (2013.01); *C09K 19/42* (2013.01); *C09K 2019/0448* (2013.01); *C09K 2019/0466* (2013.01); *C09K 2019/3422* (2013.01)

(58) Field of Classification Search
CPC .... C09K 19/3402; C09K 19/20; C09K 19/42; C09K 2019/0448; C09K 2019/0466; C09K 2019/3422; G02F 1/1333
USPC ...................... 252/299.61; 428/1.1
See application file for complete search history.

(56) References Cited

U.S. PATENT DOCUMENTS

| | | | |
|---|---|---|---|
| 7,595,101 B2 | 9/2009 | Wittek et al. | |
| 7,763,329 B2 | 7/2010 | Wittek et al. | |
| 7,838,090 B2 | 11/2010 | Wittek et al. | |
| 7,842,358 B2 | 11/2010 | Czanta et al. | |
| 7,964,253 B2 * | 6/2011 | Wittek et al. | 428/1.1 |
| 7,972,664 B2 | 7/2011 | Wittek et al. | |
| 8,017,200 B2 | 9/2011 | Wittek et al. | |
| 2004/0011996 A1 | 1/2004 | Klasen-Memmer et al. | |
| 2008/0083904 A1 | 4/2008 | Wittek et al. | |
| 2009/0194739 A1 | 8/2009 | Wittek et al. | |
| 2009/0230355 A1 | 9/2009 | Czanta et al. | |
| 2009/0289223 A1 | 11/2009 | Wittek et al. | |
| 2010/0066932 A1 | 3/2010 | Huh et al. | |
| 2010/0103366 A1 | 4/2010 | Farrand et al. | |
| 2010/0127213 A1 | 5/2010 | Czanta et al. | |
| 2010/0219375 A1 | 9/2010 | Wittek et al. | |
| 2010/0224827 A1 | 9/2010 | Wittek et al. | |
| 2010/0233956 A1 | 9/2010 | Hunziker | |
| 2010/0276635 A1 | 11/2010 | Wittek et al. | |
| 2011/0001089 A1 | 1/2011 | Wittek et al. | |

(Continued)

FOREIGN PATENT DOCUMENTS

| | | |
|---|---|---|
| CN | 101157862 A | 4/2008 |
| CN | 101508896 A | 8/2009 |

(Continued)

OTHER PUBLICATIONS

International Search Report for PCT/EP2011/005807 (dated Feb. 9, 2012).
Japanese Office Action dated Jun. 24, 2015 for corresponding Japanese Application No. JP-2013-543554.
English language Abstract for Japanese Patent Application No. JP-2010-261034; published Nov. 18, 2010.
English language Abstract for Japanese Application No. JP-2009-215556; published Sep. 24, 2009.
English language Abstract for Japanese Application No. JP-2010-525115; published Jul. 22, 2010.
English language Abstract for Japanese Application No. JP-2009-185285; published Aug. 20, 2009.

(Continued)

*Primary Examiner* — Geraldina Visconti
(74) *Attorney, Agent, or Firm* — Millen White Zelano and Branigan, PC

(57) ABSTRACT

The invention relates to a liquid-crystalline medium, characterized in that it comprises one or more compounds of the formula IA,

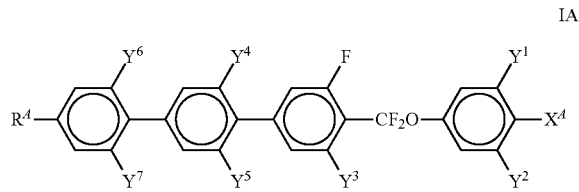

and
one or more compounds of the formula IB,

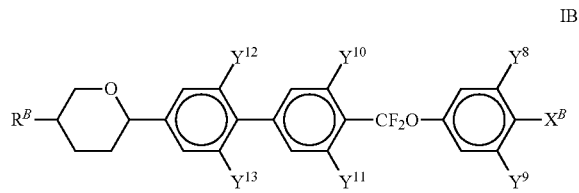

in which $R^A$, $R^B$, $X^A$, $X^B$ and $Y^{1-13}$ have the meanings indicated in claim 1, and to the use thereof for electro-optical purposes, in particular for shutter glasses, 3D applications, in TN, PS-TN, STN, TN-TFT, OCB, IPS, PS-IPS, FFS, PS-FFS and PS-VA-IPS displays.

20 Claims, No Drawings

(56) References Cited

U.S. PATENT DOCUMENTS

| | | |
|---|---|---|
| 2011/0001090 A1 | 1/2011 | Wittek et al. |
| 2011/0140039 A1 | 6/2011 | Wu et al. |
| 2011/0301360 A1 | 12/2011 | Lietzau et al. |
| 2012/0001123 A1 | 1/2012 | Jansen et al. |
| 2012/0032112 A1 | 2/2012 | Czanta et al. |
| 2012/0261616 A1 | 10/2012 | Czanta et al. |

FOREIGN PATENT DOCUMENTS

| | | |
|---|---|---|
| DE | 10-2007-007143 A1 | 4/2008 |
| DE | 10-2009-006322 A1 | 8/2009 |
| DE | 10-2009-010580 A1 | 9/2009 |
| DE | 10-2010-018170 A1 | 12/2010 |
| EP | 2100944 A1 | 9/2009 |
| JP | 2008-088433 A | 4/2008 |
| JP | 2009-185285 A | 8/2009 |
| JP | 2009/215556 A | 9/2009 |
| JP | 2010/525115 A | 7/2010 |
| JP | 2010/261034 A | 11/2010 |
| WO | 2008/128623 A1 | 10/2008 |
| WO | 2009/046803 A1 | 4/2009 |
| WO | 2009/103495 A1 | 8/2009 |
| WO | 2009/112146 A1 | 9/2009 |
| WO | 2010/017868 A1 | 2/2010 |
| WO | 2010/089092 A1 | 8/2010 |
| WO | 2010/094455 A1 | 8/2010 |
| WO | 2010/099853 A1 | 9/2010 |
| WO | 2011/082742 A1 | 7/2011 |

OTHER PUBLICATIONS

English language Abstract for Japanese Application No. JP-2008-088433; published Apr. 17, 2008.

English language Abstract for German Patent Application No. DE-10-2009-010580; published Sep. 17, 2009.

English language Abstract for German Patent Application No. DE-10-2009-006322; published Aug. 13, 2009.

English language Abstract for German Patent Application No. DE-10-2007-007143; published Apr. 10, 2008.

English language Abstract for German Patent Application No. DE-10-2010-018170; published Dec. 30, 2010.

English translation of Examination report in corresponding KR Appln. 2013-7018421 dated Dec. 21, 2017.

* cited by examiner

LIQUID-CRYSTALLINE MEDIUM

The present invention relates to a liquid-crystalline medium (LC medium), to the use thereof for electro-optical purposes, and to LC displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The commonest display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and low vapour pressure are desired.

Matrix liquid-crystal displays of this type are known. Examples of non-linear elements which can be used to individually switch the individual pixels are active elements (i.e. transistors). The term "active matrix" is then used, where a distinction can be made between two types:
1. MOS (metal oxide semiconductor) or other diodes on silicon wafers as substrate.
2. Thin-film transistors (TFTs) on a glass plate as substrate.

The use of single-crystal silicon as substrate material restricts the display size, since even modular assembly of various part-displays results in problems at the joints.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The TFT displays usually operate as TN cells with crossed polarisers in transmission and are backlit.

The term MLC displays here encompasses any matrix display with integrated non-linear elements, i.e., besides the active matrix, also displays with passive elements, such as varistors or diodes (MIM=metal-insulator-metal).

MLC displays of this type are particularly suitable for TV applications (for example pocket televisions) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff, Paris; STROMER, M., Proc. Eurodisplay 84, September 1984: Design of Thin Film Transistors for Matrix Addressing of Television Liquid Crystal Displays, pp. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable lifetimes. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallisation and/or smectic phases occur, even at low temperatures, and the temperature dependence of the viscosity is as low as possible. The MLC displays from the prior art thus do not satisfy today's requirements.

Besides liquid-crystal displays which use backlighting, i.e. are operated transmissively and if desired transflectively, reflective liquid-crystal displays are also particularly interesting. These reflective liquid-crystal displays use the ambient light for information display. They thus consume significantly less energy than backlit liquid-crystal displays having a corresponding size and resolution. Since the TN effect is characterised by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation ($d \cdot \Delta n$). This low optical retardation results in usually acceptable low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

In order to achieve 3D effects by means of shutter glasses, fast-switching mixtures having low rotational viscosities and correspondingly high optical anisotropy (Δn), in particular, are employed. Electro-optical lens systems, by means of which a 2-dimensional representation of a display can be switched to a 3-dimensional autostereoscopic representation, can be achieved using mixtures having high optical anisotropy (Δn).

Thus, there continues to be a great demand for MLC displays having very high specific resistance at the same time as a large working-temperature range, short response times, even at low temperatures, and a low threshold voltage which do not exhibit these disadvantages or only do so to a lesser extent.

In the case of TN (Schadt-Helfrich) cells, media are desired which facilitate the following advantages in the cells:

extended nematic phase range (in particular down to low temperatures)
switchability at extremely low temperatures (outdoor use, automobiles, avionics)
increased resistance to UV radiation (longer life)
low threshold voltage.

The media available from the prior art do not enable these advantages to be achieved while simultaneously retaining the other parameters.

In the case of supertwisted (STN) cells, media are desired which facilitate greater multiplexability and/or lower threshold voltages and/or broader nematic phase ranges (in particular at low temperatures). To this end, a further widening of the available parameter latitude (clearing point, smectic-nematic transition or melting point, viscosity, dielectric parameters, elastic parameters) is urgently desired.

In particular in the case of LC displays for TV and video applications (for example LCD-TVs, monitors, PDAs, notebooks, games consoles), a significant reduction in the response times is desired. This requires LC mixtures having low rotational viscosities and high dielectric anisotropies. At the same time, the LC media should have high clearing points, preferably ≥80° C.

The invention has the object of providing media, in particular for MLC, FFS, IPS, TN, positive VA or STN displays of this type, which do not exhibit the disadvantages indicated above or only do so to a lesser extent and preferably have fast response times and low rotational viscosities at the same time as a high clearing point, as well as high dielectric anisotropy and a low threshold voltage.

It has now been found that this object can be achieved if LC media comprising one or more compounds of the formula IA and one or more compounds of the formula IB are used. The compounds of the formulae IA and IB result in LC mixtures having the desired properties indicated above.

The invention relates to a liquid-crystalline medium, characterised in that it comprises one or more compounds of the formula IA

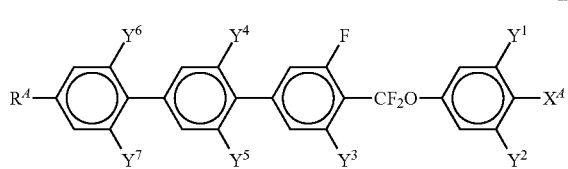

and one or more compounds of the formula IB

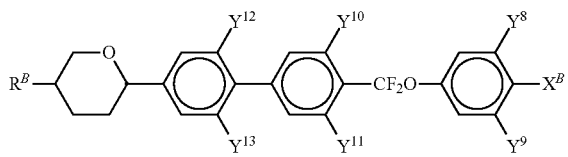

in which
$R^A$ and $R^B$ each, independently of one another, denote a halogenated or un-substituted alkyl or alkoxy radical having 1 to 15 C atoms, where, in addition, one or more $CH_2$ groups in these radicals may each be replaced, independently of one another, by —C≡C—, —$CF_2O$—, —CH=CH—,

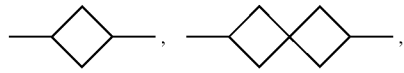

—O—, —CO—O— or —O—CO— in such a way that O atoms are not linked directly to one another,
$X^A$ and $X^B$ each, independently of one another, denote F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and
$Y^{1-13}$ each, independently of one another, denote H or F.

Surprisingly, it has been found that mixtures comprising the compounds of the formulae IA and IB have high dielectric anisotropy Δε and at the same time have an advantageous rotational viscosity $γ_1$/clearing point ratio. They are therefore particularly suitable for achieving liquid-crystal mixtures having low $γ_1$ and a very high clearing point. In addition, the compounds of the formulae IA and IB exhibit good solubility in LC media. LC media according to the invention comprising compounds of the formulae IA and IB have a low rotational viscosity, fast response times, a high clearing point, very high positive dielectric anisotropy, relatively high birefringence and a broad nematic phase range. They are therefore particularly suitable for mobile telephones, TV and video applications.

The compounds of the formulae IA and IB have a broad range of applications. Depending on the choice of substituents, they can serve as base materials of which liquid-crystalline media are predominantly composed; however, liquid-crystalline base materials from other classes of compound can also be added to the compounds of the formulae IA and IB in order, for example, to modify the dielectric and/or optical anisotropy of a dielectric of this type and/or to optimise its threshold voltage and/or its viscosity.

In the pure state, the compounds of the formulae IA and IB are colourless and form liquid-crystalline mesophases in a temperature range which is favourably located for electro-optical use. They are stable chemically, thermally and to light.

The compounds of the formulae IA and IB are prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants known per se, which are not mentioned here in greater detail.

The compounds of the formulae IA and IB are known, for example, from WO 2004/048501 A and EP 0 786 445.

If $R^A$ and $R^B$ in the formulae above and below denote an alkyl radical and/or an alkoxy radical, this may be straight-chain or branched. It is preferably straight-chain, has 2, 3, 4, 5, 6 or 7 C atoms and accordingly preferably denotes ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy. $R^A$ and $R^B$ each preferably denote straight-chain alkyl having 2-6 C atoms.

Oxaalkyl preferably denotes straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, 2-, 3-, 4-, 5-, 6-, 7-, 8- or 9-oxadecyl.

If $R^A$ and $R^B$ denote an alkyl radical in which one $CH_2$ group has been replaced by —CH=CH—, this may be straight-chain or branched. It is preferably straight-chain and has 2 to 10 C atoms. Accordingly, it denotes, in particular, vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, dec-1-, -2-, -3-, -4-, -5-, -6-, -7-, -8- or -9-enyl.

If $R^A$ and $R^B$ denote an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

In the formulae above and below, $X^A$ and/or $X^B$ are preferably F, Cl or a mono- or polyfluorinated alkyl or alkoxy radical having 1, 2 or 3 C atoms or a mono- or polyfluorinated alkenyl radical having 2 or 3 C atoms. $X^A$ and/or $X^B$ are particularly preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$, $OCH=CF_2$ or $CH=CF_2$, very particularly preferably F or $OCF_3$, furthermore $CF_3$, $OCF=CF_2$, $OCHF_2$ or $OCH=CF_2$.

Particular preference is given to compounds of the formulae IA and IB in which $X^A$ and/or $X^B$ denote F or $OCF_3$, preferably F. Preferred compounds of the formula IA are those in which $Y^1$ denotes F, those in which $Y^2$ denotes F, those in which $Y^3$ denotes H, those in which $Y^4$ denotes H and $Y^5$ denotes F, and those in which $Y^6$ and $Y^7$ each denote H. Preferred compounds of the formula IB are those in which $Y^8$ denotes F, those in which $Y^9$ denotes F, those in which $Y^{19}$ denotes F, those in which $Y^{11}$ denotes F, and those in which $Y^{12}$ and $Y^{13}$ each denote H.

Particularly preferred compounds of the formula IA are selected from the following sub-formulae:

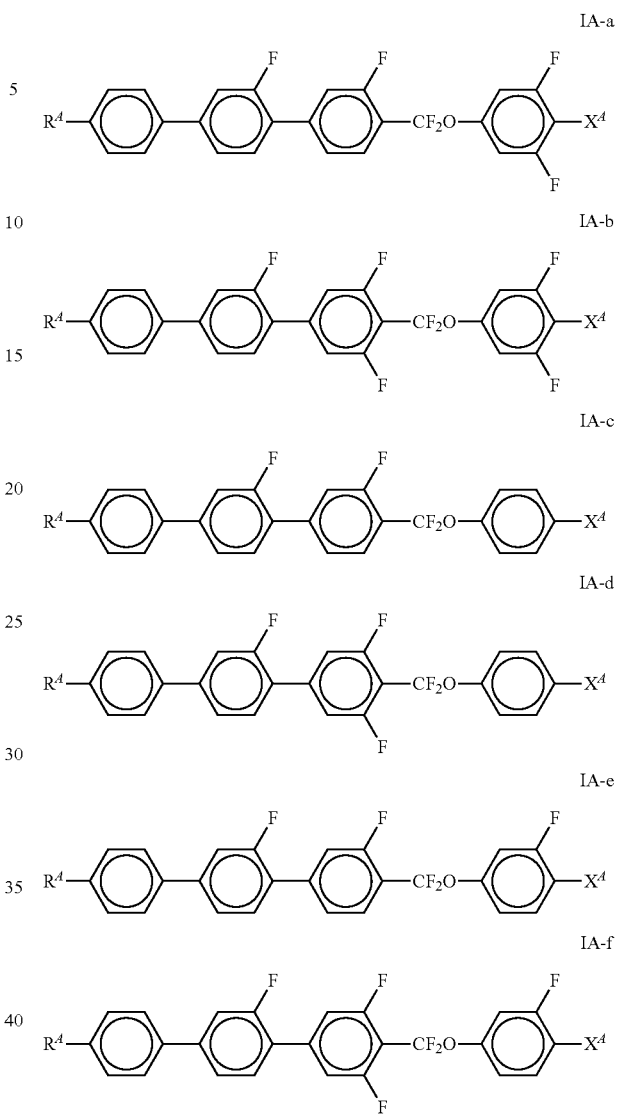

in which $R^A$ and $X^A$ have the meanings indicated in claim 1. $R^A$ preferably denotes straight-chain alkyl having 1 to 6 C atoms, in particular ethyl and propyl, furthermore alkenyl having 2 to 6 C atoms.

Very particular preference is given to the compound of the sub-formula IA-b.

Particularly preferred compounds of the formula IB are selected from the following sub-formulae:

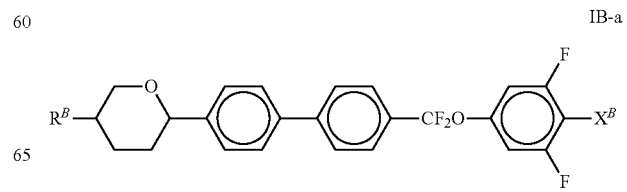

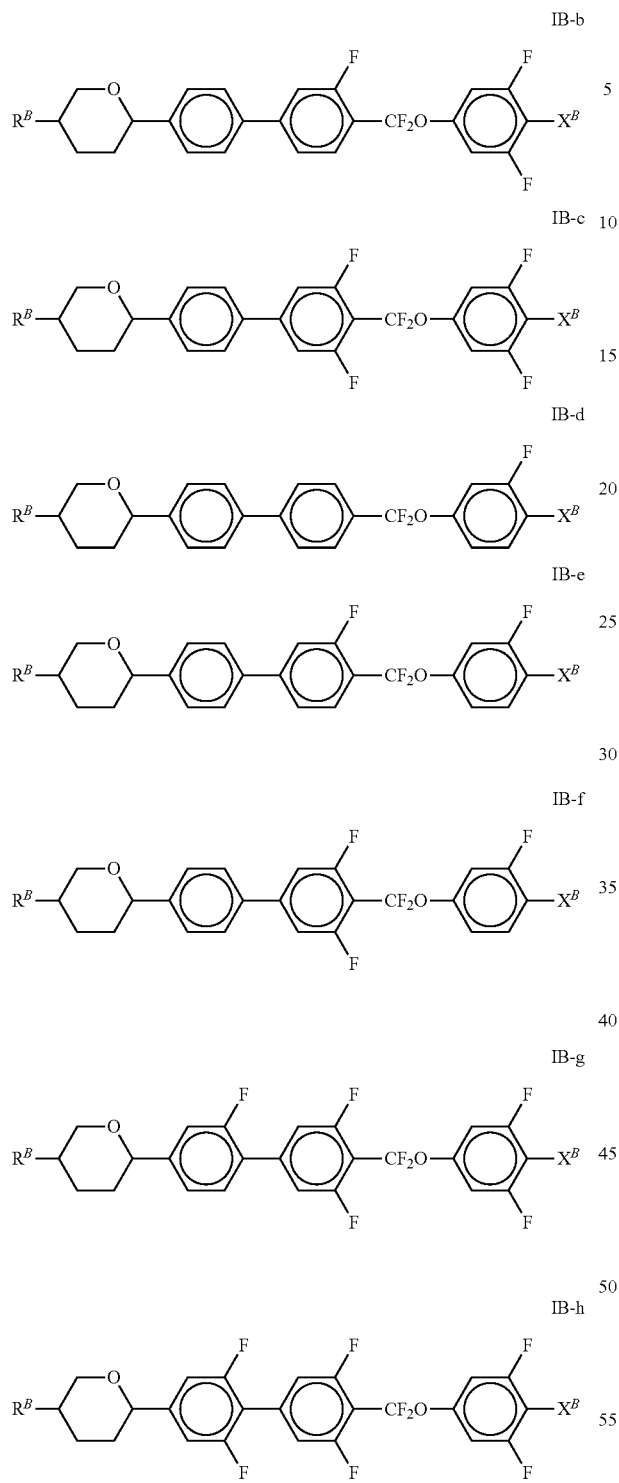

in which $R^B$ and $X^B$ have the meanings indicated in claim 1.

$R^B$ preferably denotes straight-chain alkyl having 1 to 6 C atoms, in particular propyl, butyl and pentyl, furthermore alkenyl having 2 to 6 C atoms.

Very particular preference is given to the compound of the sub-formula IB-c.

Further preferred embodiments are indicated below:

The medium additionally comprises one or more compounds of the formulae II and/or III

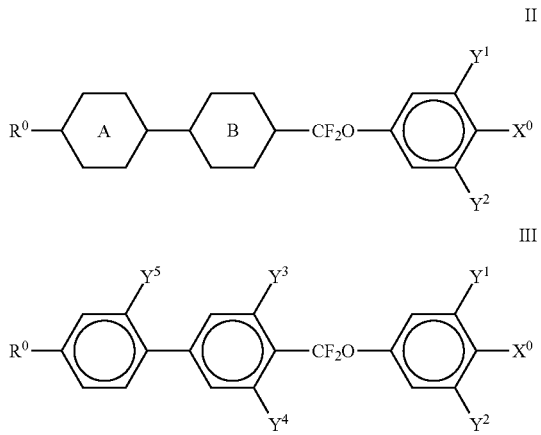

in which $R^0$ denotes a halogenated or unsubstituted alkyl or alkoxy radical having 1 to 15 C atoms, where, in addition, one or more $CH_2$ groups in these radicals may each be replaced, independently of one another, by —C≡C—, —$CF_2$O—, —CH=CH—,

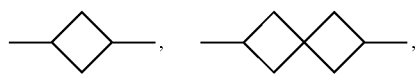

—O—, —CO—O— or —O—CO— in such a way that O atoms are not linked directly to one another, $X^0$ denotes F, Cl, CN, $SF_5$, SCN, NCS, a halogenated alkyl radical, a halogenated alkenyl radical, a halogenated alkoxy radical or a halogenated alkenyloxy radical having up to 6 C atoms, and $Y^{1-5}$ each, independently of one another, denote H or F,

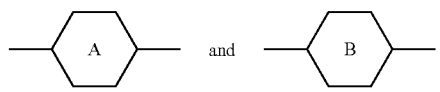

each, independently of one another, denote

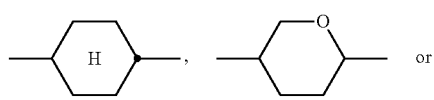

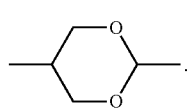

The compounds of the formula II are preferably selected from the following formulae:

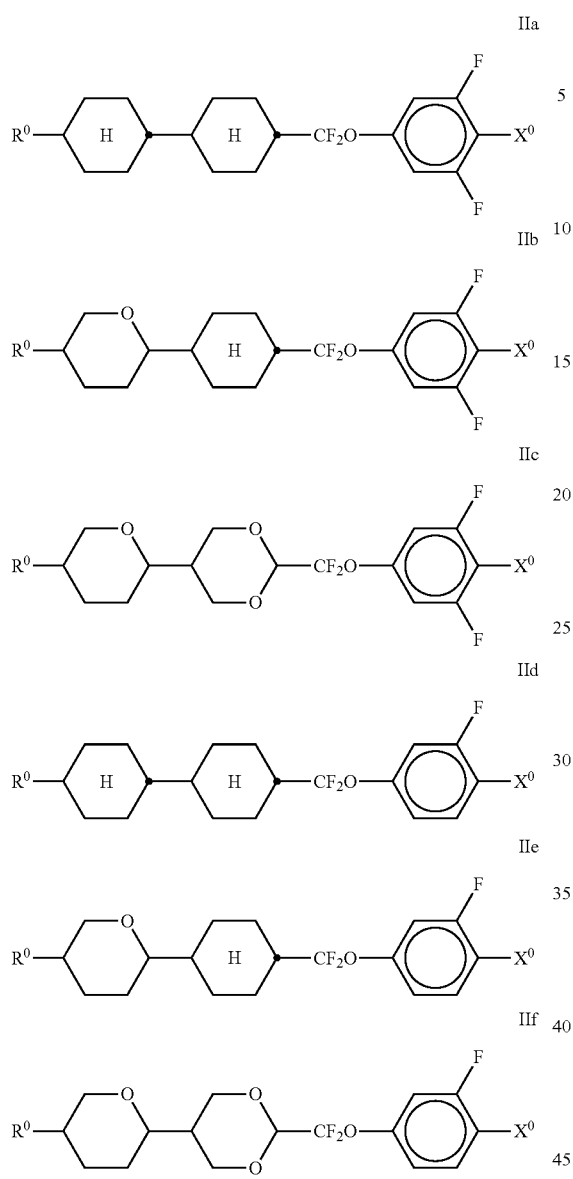

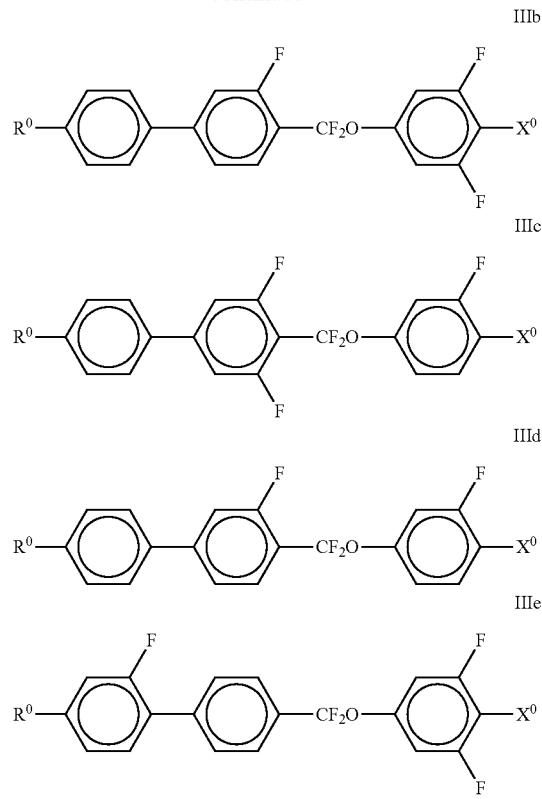

in which $R^0$ and $X^0$ have the meanings indicated above.

$R^0$ preferably denotes alkyl having 1 to 6 C atoms. $X^0$ preferably denotes F. Particular preference is given to compounds of the formulae IIIa and IIIe, in particular compounds of the formula IIIa;

The medium additionally comprises one or more compounds selected from the following formulae:

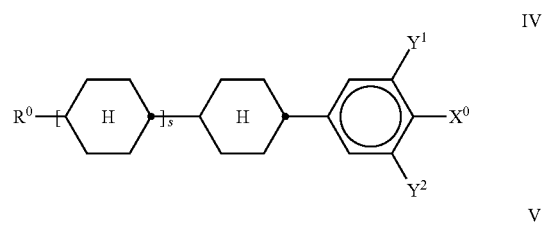

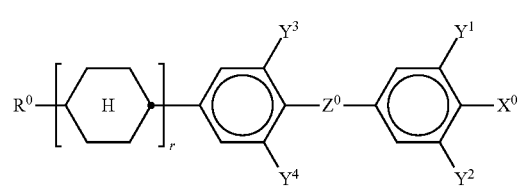

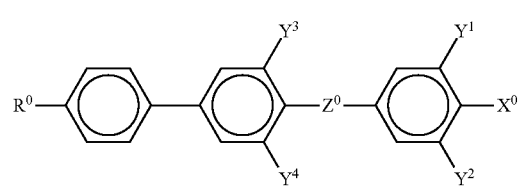

in which $R^0$ and $X^0$ have the meanings indicated above.

$R^0$ preferably denotes alkyl having 1 to 6 C atoms. $X^0$ preferably denotes F. Particular preference is given to compounds of the formulae IIa and IIb, in particular compounds of the formulae IIa and IIb in which X denotes F.

The compounds of the formula III are preferably selected from the following formulae:

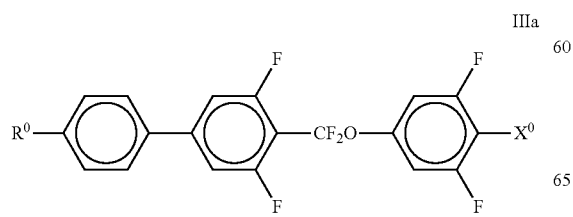

-continued

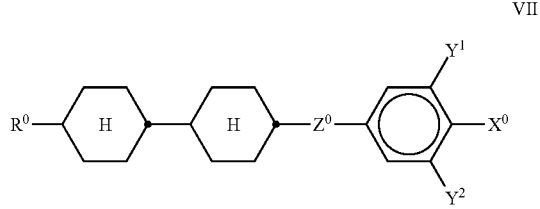

VII

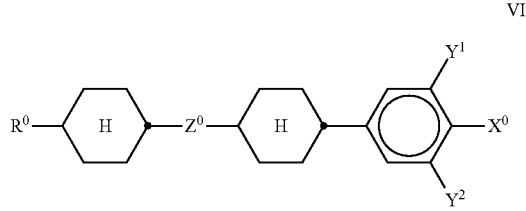

VIII in which

R⁰, X⁰ and Y¹⁻⁴ have the meanings indicated above, and Z⁰ denotes —C₂H₄—, —(CH₂)₄—, —CH═CH—, —CF═CF—, —C₂F₄—, —CH₂CF₂—, —CF₂CH₂—, —CH₂O—, —OCH₂—, —COO— or —OCF₂—, in formulae V and VI also a single bond, in formulae V and VIII also —CF₂O—, r denotes 0 or 1, and denotes 0 or 1;

The compounds of the formula IV are preferably selected from the following formulae:

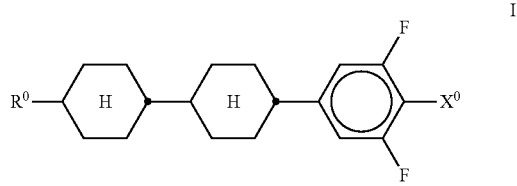

IVa

IVb

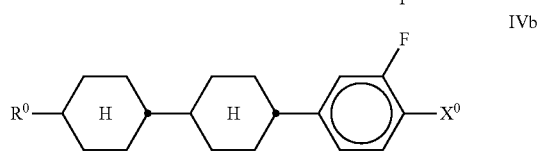

IVc

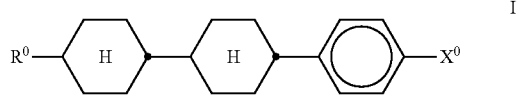

IVd

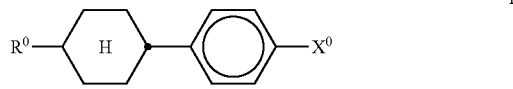

in which R⁰ and X⁰ have the meanings indicated above. R⁰ preferably denotes alkyl having 1 to 6 C atoms. X⁰ preferably denotes F or OCF₃, furthermore OCF═CF₂ or Cl;

The compounds of the formula V are preferably selected from the following formulae:

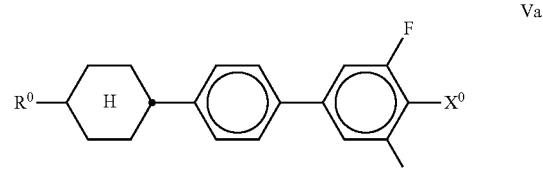

Va

Vb

Vc

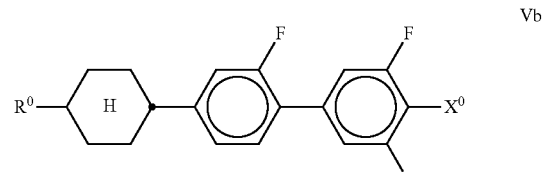

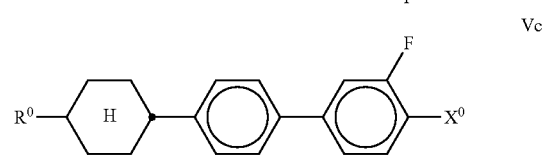

Vd

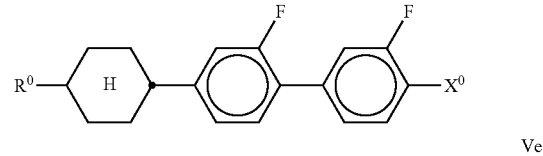

Ve

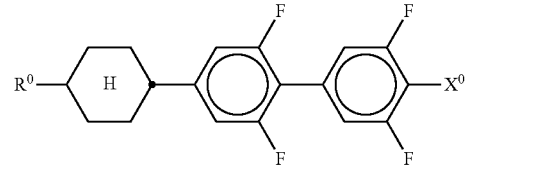

Vf

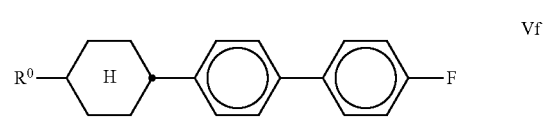

Vg

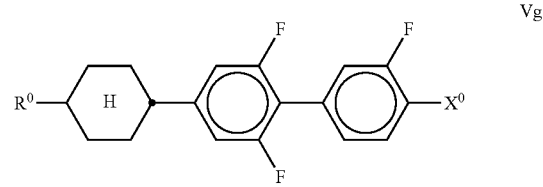

Vh

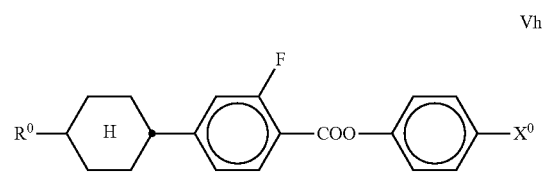

in which R⁰ and X⁰ have the meanings indicated above. R⁰ preferably denotes alkyl having 1 to 6 C atoms. X⁰ preferably denotes F and OCF₃, furthermore OCHF₂, CF₃, OCF═CF₂ and OCH═CF₂;

The compounds of the formula VI are preferably selected from the following formulae:

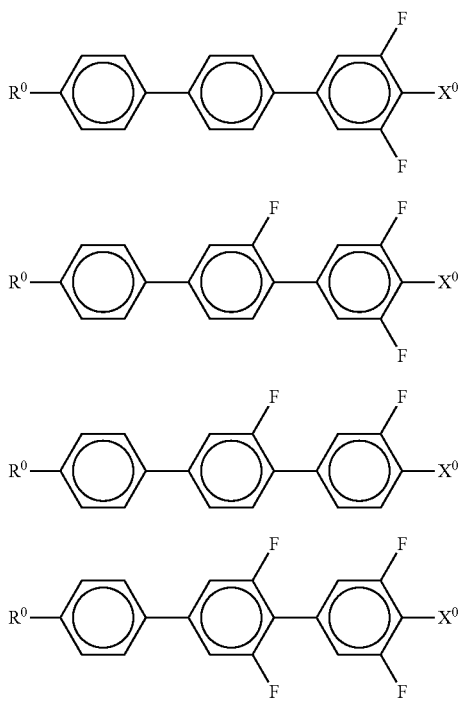

VIa, VIb, VIc, VId in which R⁰ and X⁰ have the meanings indicated above. R⁰ preferably denotes alkyl having 1 to 6 C atoms. X⁰ preferably denotes F, furthermore OCF$_3$, CF$_3$, CF=CF$_2$, OCHF$_2$ and OCH=CF$_2$;

The compounds of the formula VII are preferably selected from the following formulae:

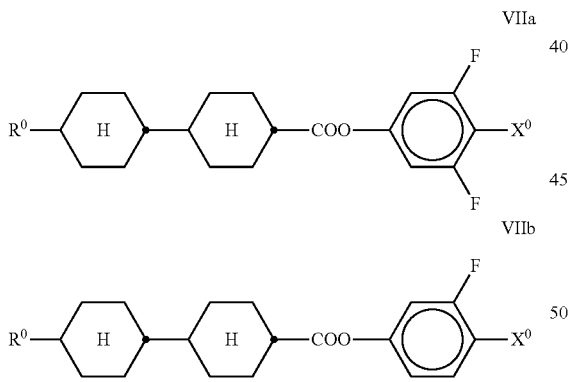

VIIa, VIIb in which R⁰ and X⁰ have the meanings indicated above. R⁰ preferably denotes alkyl having 1 to 6 C atoms. X⁰ preferably denotes F, furthermore OCF$_3$, OCHF$_2$ and OCH=CF$_2$.

The medium additionally comprises one or more compounds selected from the following formulae:

IX

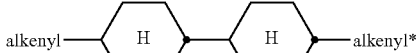

X

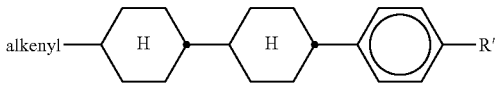

XI

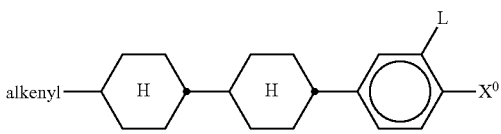

XII in which X⁰ has the meanings indicated above, and

L denotes H or F,

"alkyl" denotes C$_{1-6}$-alkyl,

R' denotes C$_{1-6}$-alkyl, C$_{1-6}$-alkoxy or C$_{2-6}$-alkenyl, and

"alkenyl" and "alkenyl*" each, independently of one another, denote C$_{2-6}$-alkenyl.

The compounds of the formulae IX-XII are preferably selected from the following formulae:

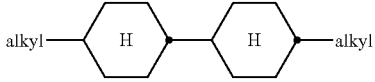

IXa

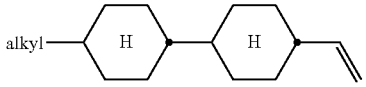

IXb

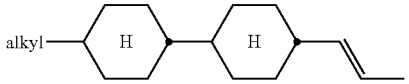

IXc

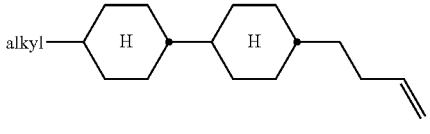

IXd

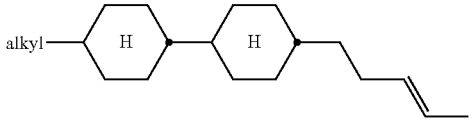

IXe

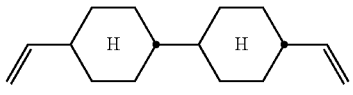

Xa

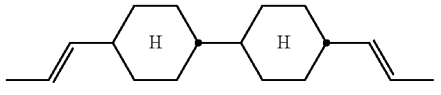

Xb

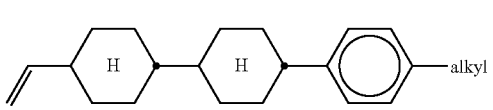

XIa

-continued

XIIa
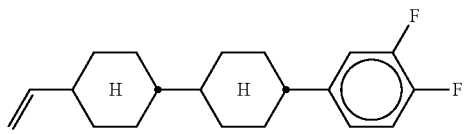

in which "alkyl" has the meaning indicated above.
Particular preference is given to the compounds of the formulae IXa, IXb, IXc, Xa, Xb, XIa and XIIa. In the formulae IXb and IX, "alkyl" preferably, independently of one another, denotes n-$C_3H_7$, n-$C_4H_9$ or n-$C_5H_{11}$, in particular n-$C_3H_7$.

The medium additionally comprises one or more compounds selected from the following formulae:

XIII
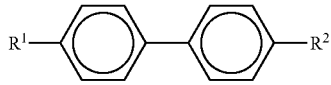

XIV
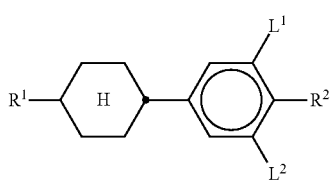

in which $L^1$ and $L^2$ have the meanings indicated above, and $R^1$ and $R^2$ each, independently of one another, denote n-alkyl, alkoxy, oxaalkyl, fluoroalkyl or alkenyl, each having up to 6 C atoms, and preferably each, independently of one another, denote alkyl having 1 to 6 C atoms; in the compound of the formula XIII, at least one of the radicals $R^1$ and $R^2$ preferably denotes alkenyl having 2 to 6 C atoms.

The medium comprises one or more compounds of the formula XIII in which at least one of the radicals $R^1$ and $R^2$ denotes alkenyl having 2 to 6 C atoms, preferably those selected from the following formulae:

XIIIa
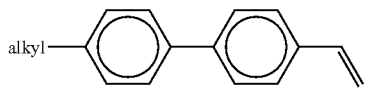

XIIIb
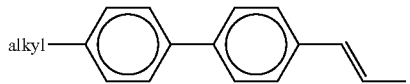

XIIIc
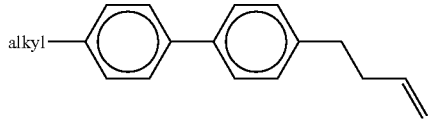

XIIId
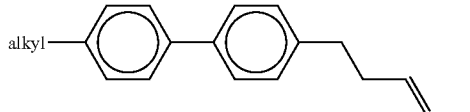

in which "alkyl" has the meaning indicated above;

The medium comprises one or more compounds of the following formulae:

XV
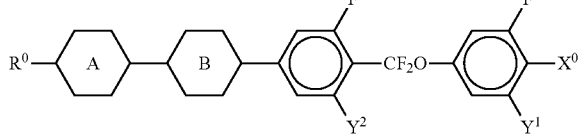

XVI
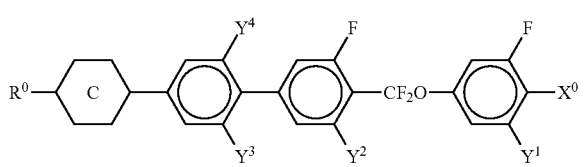

in which $R^0$, $X^0$ and $Y^{1-4}$ have the meanings indicated in formula I, and

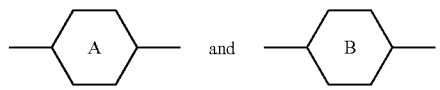

each, independently of one another, denote

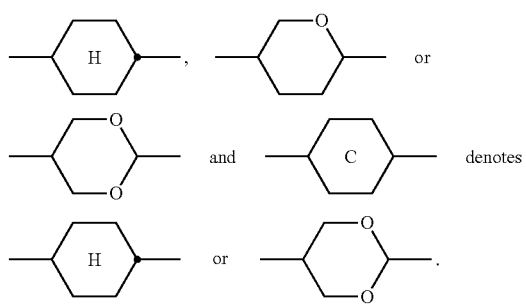

The compounds of the formulae XV and XVI are preferably selected from the following formulae:

XVa
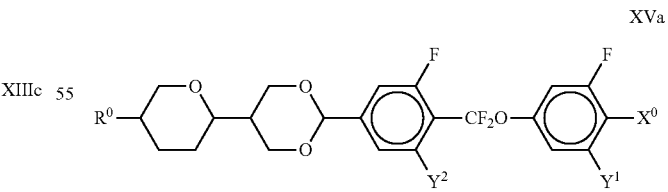

XVb
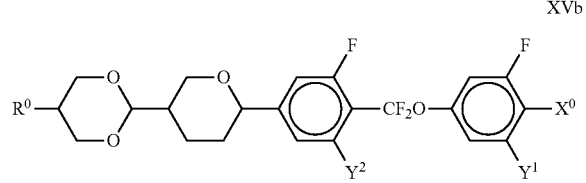

-continued

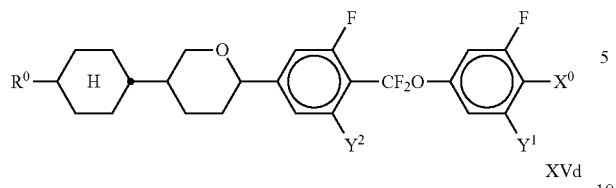
XVc

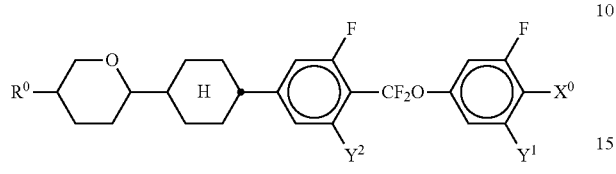
XVd

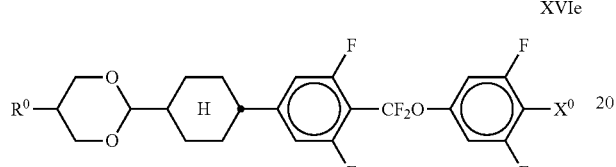
XVe

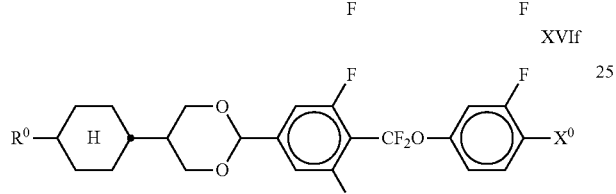
XVf

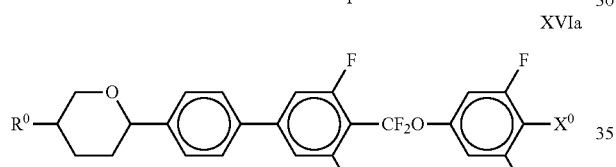
XVIa

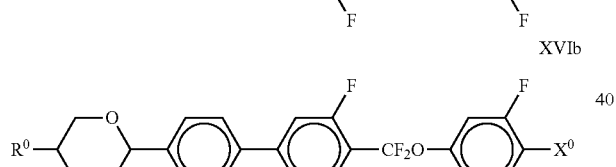
XVIb

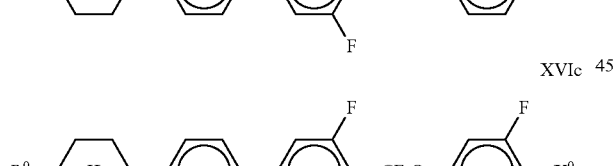
XVIc

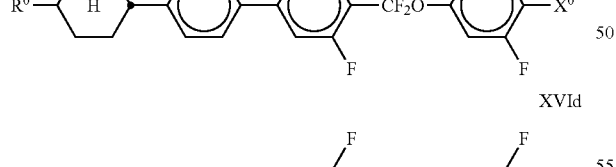
XVId

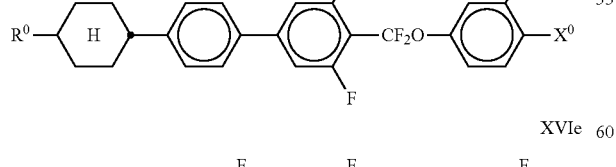
XVIe

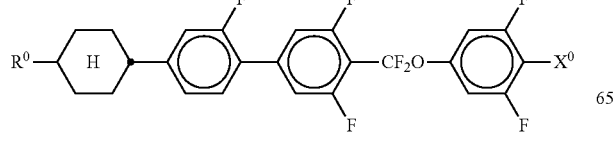

-continued

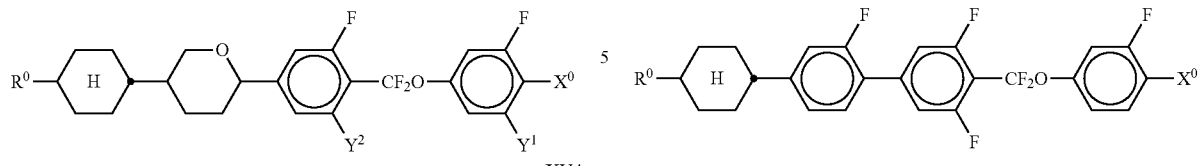
XVIf in which $R^0$ and $X^0$ have the meanings indicated above. $R^0$ preferably denotes alkyl having 1 to 6 C atoms. $X^0$ preferably denotes F, furthermore $OCF_3$. Particularly preferred compounds of the formulae XV and XVa-XVf are those in which $Y^1$ denotes F and $Y^2$ denotes H or F, preferably F. The mixture according to the invention particularly preferably comprises at least one compound of the formula XVf.

The medium comprises one or more compounds of the formula XVII,

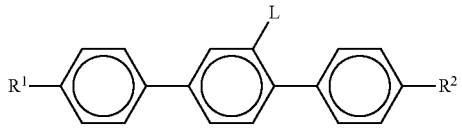
XVII in which $R^1$ and $R^2$ have the meanings indicated above and preferably each, independently of one another, denote alkyl having 1 to 6 C atoms. L denotes H or F. Particularly preferred compounds of the formula XVII are those of the sub-formulae

XVII-a

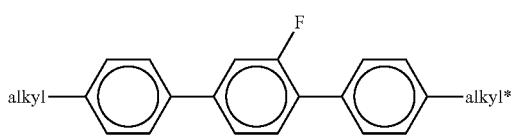
XVII-b

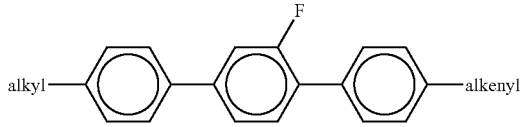
XVII-c

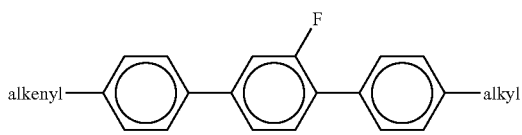
XVII-d

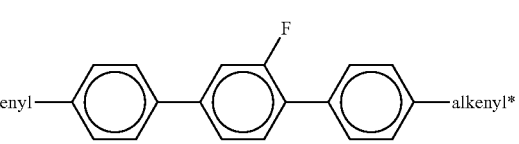
XVII-e

-continued

XVII-f

in which
alkyl and alkyl* each, independently of one another, denote a straight-chain alkyl radical having 1-6 C atoms, in particular ethyl, propyl and pentyl,
alkenyl
and alkenyl* each, independently of one another, denote a straight-chain alkenyl radical having 2-6 C atoms, in particular $CH_2=CHC_2H_4$, $CH_3CH=CHC_2H_4$, $CH_2=CH$ and $CH_3CH=CH$.
Particular preference is given to the compounds of the formulae XVII-b and XVII-c. Very particular preference is given to the compounds of the formulae

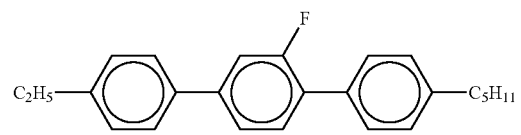

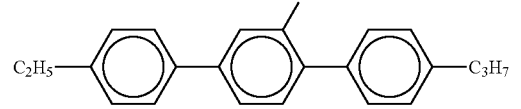

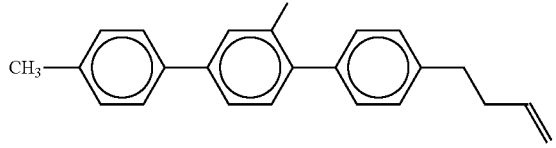

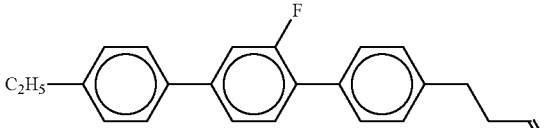

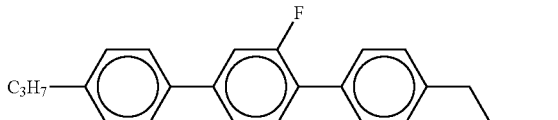

The medium comprises one or more compounds of the following formulae:

XVIIIa

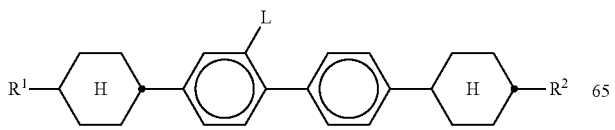

-continued

XVIIIb

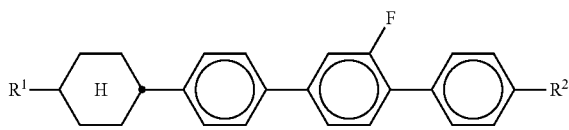

in which $R^1$ and $R^2$ have the meanings indicated above and preferably each, independently of one another, denote alkyl having 1 to 6 C atoms. L denotes H or F;
The medium additionally comprises one or more compounds selected from the following formulae:

XIX

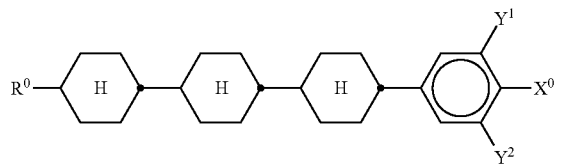

XX

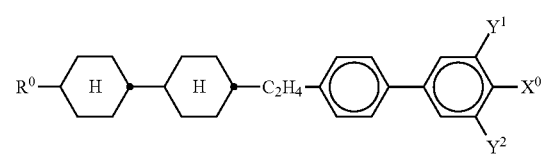

XXI

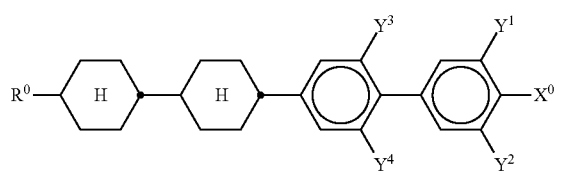

XXII

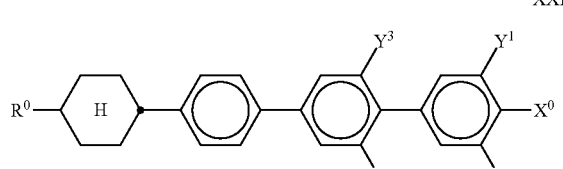

XXIII

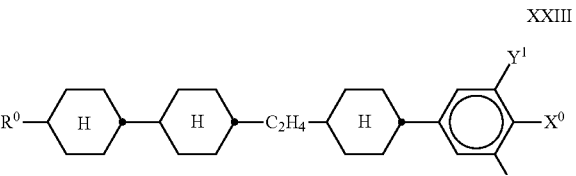

XXIV

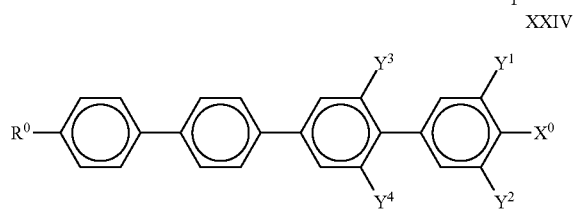

in which $R^0$ and $X^0$ each, independently of one another, have one of the meanings indicated above, and $Y^{1-4}$ each, independently of one another, denote H or F. $X^0$ is preferably F, Cl, $CF_3$, $OCF_3$ or $OCHF_2$. $R^0$ preferably denotes alkyl, alkoxy, oxaalkyl, fluoroalkyl or alkenyl, each having up to 6 C atoms.

The mixture according to the invention particularly preferably comprises one or more compounds of the formula XXIV-a,

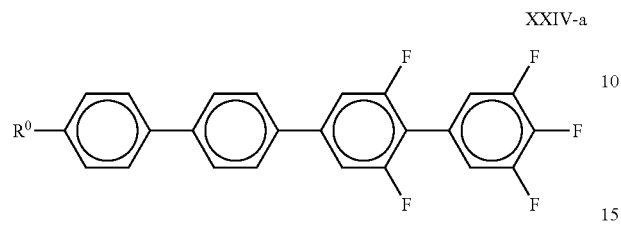

XXIV-a in which $R^0$ has the meanings indicated above. $R^0$ preferably denotes straight-chain alkyl, in particular ethyl, n-propyl, n-butyl and n-pentyl and very particularly preferably n-propyl. The compound(s) of the formula XXIV, in particular of the formula XXIV-a, is (are) preferably employed in the mixtures according to the invention in amounts of 0.5-20% by weight, particularly preferably 1-15% by weight.

The medium additionally comprises one or more compounds of the formula XXIV,

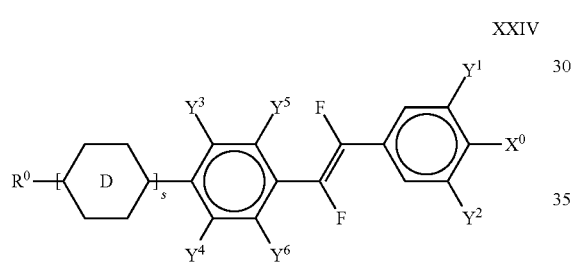

XXIV in which $R^0$, $X^0$ and $Y^{1-6}$ have the meanings indicated in formula I, s denotes 0 or 1, and

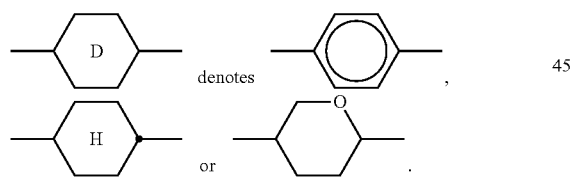

In the formula XXIV, $X^0$ may also denote an alkyl radical having 1-6 C atoms or an alkoxy radical having 1-6 C atoms. The alkyl or alkoxy radical is preferably straight-chain.

$R^0$ preferably denotes alkyl having 1 to 6 C atoms. $X^0$ preferably denotes F;

The compounds of the formula XXIV are preferably selected from the following formulae:

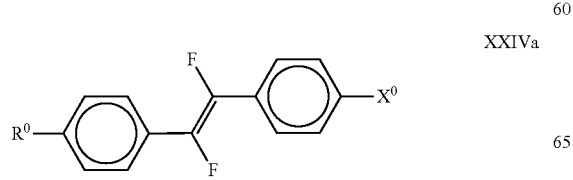

XXIVa

-continued

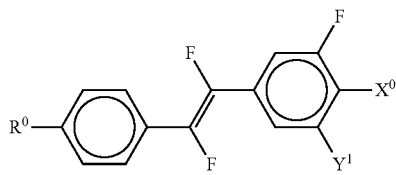

XXIVb

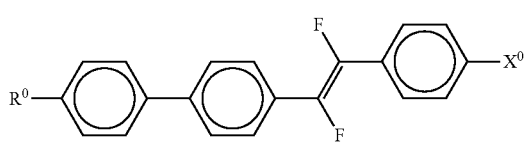

XXIVc

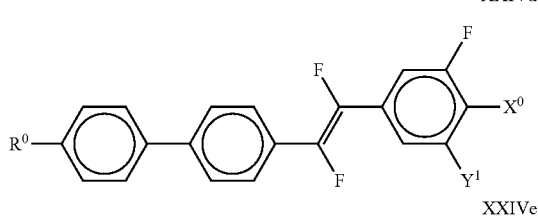

XXIVd

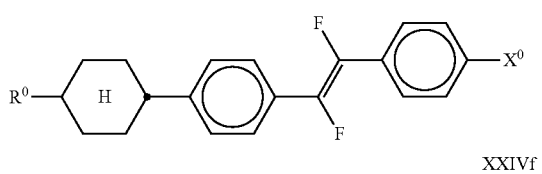

XXIVe

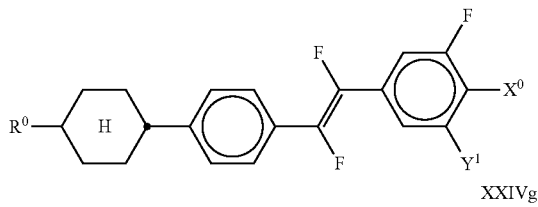

XXIVf

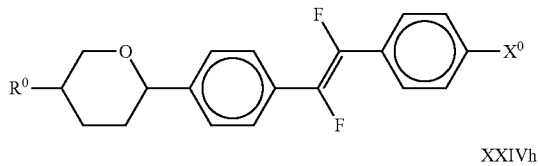

XXIVg

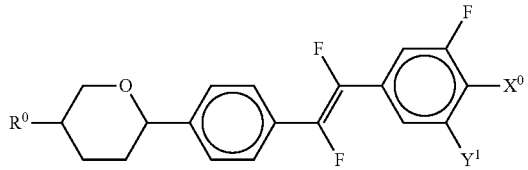

XXIVh in which $R^0$, $X^0$ and $Y^1$ have the meanings indicated above. $R^0$ preferably denotes alkyl having 1 to 6 C atoms. $X^0$ preferably denotes F, and $Y^1$ is preferably F;

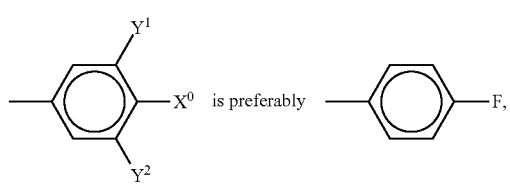

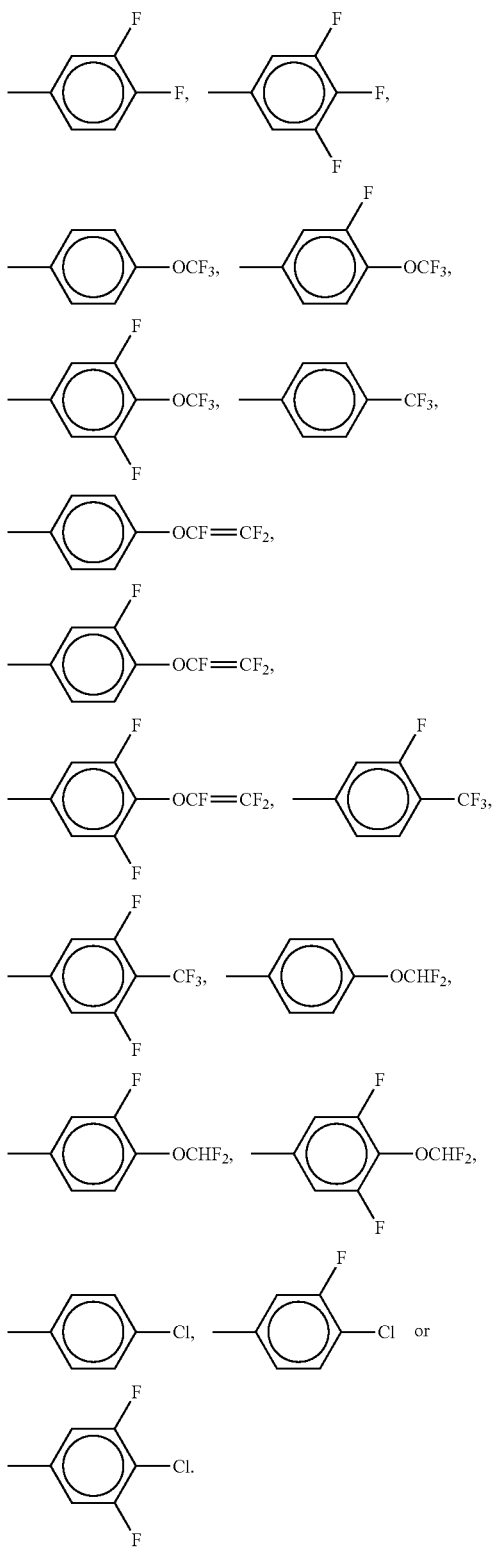

$R^0$ is straight-chain alkyl or alkenyl having 2 to 6 C atoms;

The medium comprises one or more compounds of the following formulae:

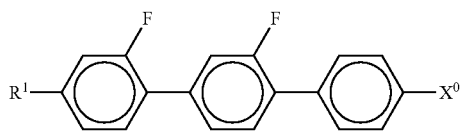

XXV

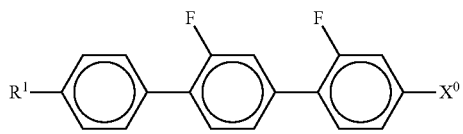

XXVI in which $R^1$ and $X^0$ have the meanings indicated above. $R^1$ preferably denotes alkyl having 1 to 6 C atoms. $X^0$ preferably denotes F or Cl. In the formula XXV, $X^0$ very particularly preferably denotes Cl.

The medium comprises one or more compounds of the following formulae:

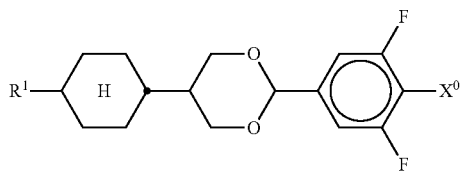

XXVII

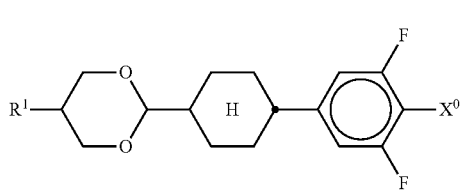

XXVIII

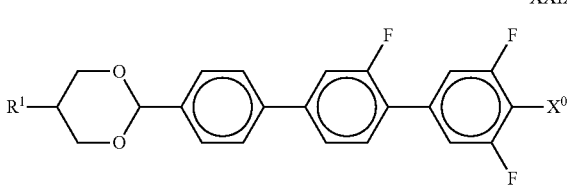

XXIX in which $R^1$ and $X^0$ have the meanings indicated above. $R^1$ preferably denotes alkyl having 1 to 6 C atoms. $X^0$ preferably denotes F. The medium according to the invention particularly preferably comprises one or more compounds of the formula XXIX in which $X^0$ preferably denotes F. The compound(s) of the formulae XXVII-XXIX is (are) preferably employed in the mixtures according to the invention in amounts of 1-20% by weight, particularly preferably 1-15% by weight. Particularly preferred mixtures comprise at least one compound of the formula XXIX.

The medium comprises one or more compounds of the following pyrimidine or pyridine compounds of the formulae

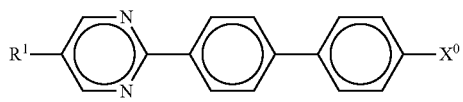

M-1

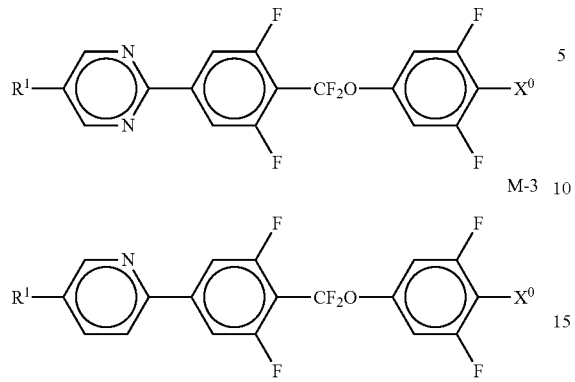

M-2

M-3 in which $R^1$ and $X^0$ have the meanings indicated above. $R^1$ preferably denotes alkyl having 1 to 6 C atoms. $X^0$ preferably denotes F. The medium according to the invention particularly preferably comprises one or more compounds of the formula M-1, in which $X^0$ preferably denotes F. The compound(s) of the formulae M-1-M-3 is (are) preferably employed in the mixtures according to the invention in amounts of 1-20% by weight, particularly preferably 1-15% by weight.

Further preferred embodiments are indicated below:

The medium comprises two or more compounds of the formula IA, in particular of the formula IA-b;

The medium comprises 2-30% by weight, preferably 3-20% by weight, particularly preferably 3-15% by weight, of compounds of the formula IA;

Besides the compounds of the formulae IA and IB, the medium comprises further compounds selected from the group of the compounds of the formulae II, III, IX-XIII, XVII and XVIII;

The proportion of compounds of the formulae II, III, IX-XIII, XVII and XVIII in the mixture as a whole is 40 to 95% by weight;

The medium comprises 10-50% by weight, particularly preferably 12-40% by weight, of compounds of the formulae II and/or III;

The medium comprises 20-70% by weight, particularly preferably 25-65% by weight, of compounds of the formulae IX-XIII;

The medium comprises 4-30% by weight, particularly preferably 5-20% by weight, of compounds of the formula XVII;

The medium comprises 1-20% by weight, particularly preferably 2-15% by weight, of compounds of the formula XVIII;

The medium comprises at least two compounds of the formulae

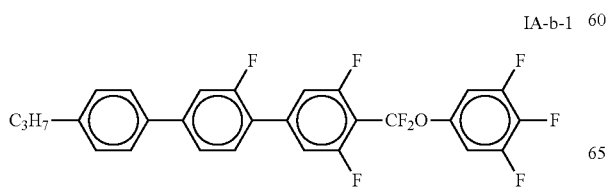

IA-b-1

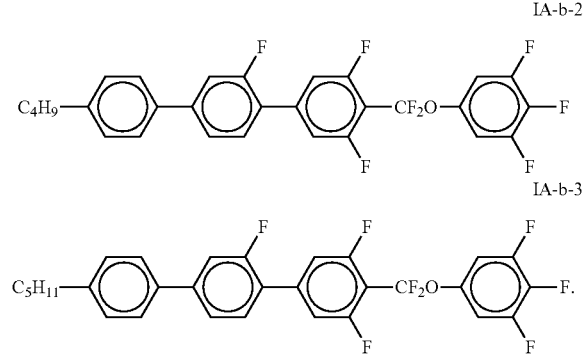

IA-b-2

IA-b-3

The medium comprises at least two compounds of the formulae

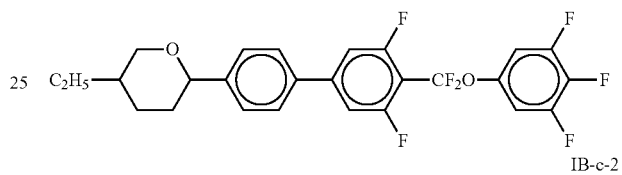

IB-c-1

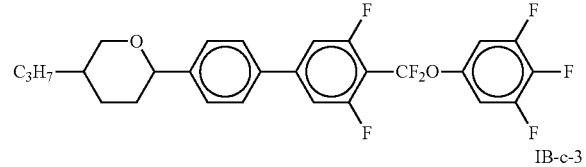

IB-c-2

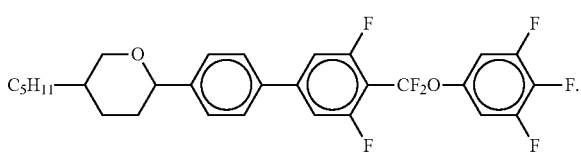

IB-c-3

The medium comprises at least two compounds of the formula IA and at least two compounds of the formula IB.

The medium comprises at least one compound of the formula IA and at least one compound of the formula IB and at least one compound of the formula IIIa.

The medium comprises at least two compounds of the formula IA and at least two compounds of the formula IB and at least one compound of the formula IIIa.

The medium comprises 25% by weight, preferably 30% by weight, of one or more compounds of the formula IA and one or more compounds of the formula IB.

The medium comprises 20% by weight, preferably ≥24% by weight, preferably 25-60% by weight, of compounds of the formula IXb, in particular the compound of the formula IXb-1,

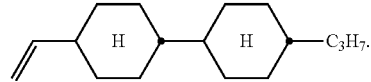

IXb-1

The medium comprises at least one compound of the formula IXb-1 and at least one compound of the formula IXc-1,

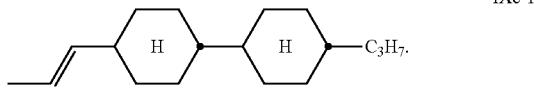

The medium comprises at least one compound of the formula DPGU-n-F.
The medium comprises at least one compound of the formula CDUQU-n-F.
The medium comprises at least one compound of the formula CPU-n-OXF.
The medium comprises at least one compound of the formula PPGU-n-F.
The medium comprises at least one compound of the formula PGP-n-m, preferably two or three compounds.
The medium comprises at least one compound of the formula PGP-2-2V having the structure

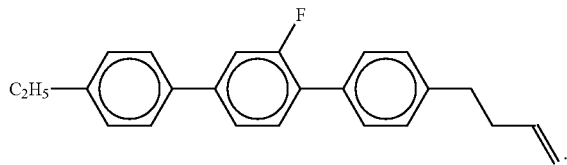

It has been found that ≥20% by weight, preferably ≥25% by weight, of compounds of the formulae IA and IB mixed with conventional liquid-crystal materials, but in particular with one or more compounds of the formulae II to XXVIII, results in a significant increase in the light stability and in low birefringence values, with broad nematic phases with low smectic-nematic transition temperatures being observed at the same time, improving the shelf life. At the same time, the mixtures exhibit very low threshold voltages, very good values for the VHR on exposure to UV, and very high clearing points.

The term "alkyl" or "alkyl*" in this application encompasses straight-chain and branched alkyl groups having 1-6 carbon atoms, in particular the straight-chain groups methyl, ethyl, propyl, butyl, pentyl and hexyl. Groups having 2-5 carbon atoms are generally preferred.

The term "alkenyl" or "alkenyl*" encompasses straight-chain and branched alkenyl groups having 2-6 carbon atoms, in particular the straight-chain groups. Preferred alkenyl groups are $C_2$-$C_7$-1E-alkenyl, $C_4$-$C_6$-3E-alkenyl, in particular $C_2$-$C_6$-1E-alkenyl. Examples of particularly preferred alkenyl groups are vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 4E-hexenyl and 5-hexenyl. Groups having up to 5 carbon atoms are generally preferred, in particular $CH_2$=CH, $CH_3$CH=CH.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxy" preferably encompasses straight-chain radicals of the formula $C_nH_{2n+1}$—O—$(CH_2)_m$, in which n and m each, independently of one another, denote 1 to 6. m may also denote 0. Preferably, n=1 and m=1-6 or m=0 and n=1-3.

Through a suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and lower values of $k_{33}/k_{11}$ compared with alkyl and alkoxy radicals. The mixtures according to the invention are distinguished, in particular, by high Δε values and thus have significantly faster response times than the mixtures from the prior art.

The optimum mixing ratio of the compounds of the above-mentioned formulae depends substantially on the desired properties, on the choice of the components of the above-mentioned formulae and on the choice of any further components that may be present.

Suitable mixing ratios within the range indicated above can easily be determined from case to case.

The total amount of compounds of the above-mentioned formulae in the mixtures according to the invention is not crucial. The mixtures can therefore comprise one or more further components for the purposes of optimisation of various properties. However, the observed effect on the desired improvement in the properties of the mixture is generally greater, the higher the total concentration of compounds of the above-mentioned formulae.

In a particularly preferred embodiment, the media according to the invention comprise compounds of the formulae II to VIII (preferably II, III, IV and V, in particular IIa and IIIa) in which $X^0$ denotes F, $OCF_3$, $OCHF_2$, OCH=$CF_2$, OCF=$CF_2$ or $OCF_2$—$CF_2$H. A favourable synergistic action with the compounds of the formulae IA and IB results in particularly advantageous properties. In particular, mixtures comprising compounds of the formulae IA and IB, IIa and IIIa are distinguished by their low threshold voltage.

The individual compounds of the above-mentioned formulae and the sub-formulae thereof which can be used in the media according to the invention are either known or can be prepared analogously to the known compounds.

The invention also relates to electro-optical displays, such as, for example, STN or MLC displays, having two plane-parallel outer plates, which, together with a frame, form a cell, integrated non-linear elements for switching individual pixels on the outer plates, and a nematic liquid-crystal mixture having positive dielectric anisotropy and high specific resistance located in the cell, which contain media of this type, and to the use of these media for electro-optical purposes.

The liquid-crystal mixtures according to the invention enable a significant broadening of the available parameter latitude. The achievable combinations of clearing point, viscosity at low temperature, thermal and UV stability and high optical anisotropy are far superior to previous materials from the prior art.

The mixtures according to the invention are particularly suitable for mobile applications and TFT applications, such as, for example, mobile telephones and PDAs. Furthermore, the mixtures according to the invention can be used in FFS, VA-IPS, OCB and IPS displays.

The liquid-crystal mixtures according to the invention, while retaining the nematic phase down to −20° C. and preferably down to −30° C., particularly preferably down to −40° C., and the clearing point ≥75° C., preferably ≥80° C., at the same time allow rotational viscosities $\gamma_1$ of ≤110 mPa·s, particularly preferably ≤100 mPa·s, to be achieved, enabling excellent MLC displays having fast response times to be achieved. The rotational viscosities are determined at 20° C.

The dielectric anisotropy Δε of the liquid-crystal mixtures according to the invention at 20° C. is preferably ≥+8, particularly preferably ≥+10, especially preferably ≥12. In addition, the mixtures are characterised by low operating voltages. The threshold voltage of the liquid-crystal mixtures according to the invention is preferably ≤2.0 V. The birefringence Δn of the liquid-crystal mixtures according to the invention at 20° C. is preferably ≥0.09, particularly preferably ≥0.10.

The nematic phase range of the liquid-crystal mixtures according to the invention preferably has a width of at least 90°, in particular at least 100°. This range preferably extends at least from −25° to +70° C.

It goes without saying that, through a suitable choice of the components of the mixtures according to the invention, it is also possible for higher clearing points (for example above 100° C.) to be achieved at higher threshold voltages or lower clearing points to be achieved at lower threshold voltages with retention of the other advantageous properties. At viscosities correspondingly increased only slightly, it is likewise possible to obtain mixtures having a higher Δε and thus low thresholds. The MLC displays according to the invention preferably operate at the first Gooch and Tarry transmission minimum [C. H. Gooch and H. A. Tarry, Electron. Lett. 10, 2-4, 1974; C. H. Gooch and H. A. Tarry, Appl. Phys., Vol. 8, 1575-1584, 1975], where, besides particularly favourable electro-optical properties, such as, for example, high steepness of the characteristic line and low angle dependence of the contrast (German patent 30 22 818), lower dielectric anisotropy is sufficient at the same threshold voltage as in an analogous display at the second minimum. This enables significantly higher specific resistance values to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae IA and IB exhibit a significantly smaller decrease in the HR on UV exposure than analogous mixtures comprising cyanophenylcyclohexanes of the formula

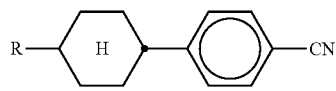

or esters of the formula

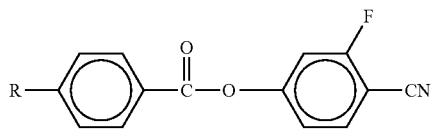

instead of the compounds of the formulae IA and IB.

The light stability and UV stability of the mixtures according to the invention are considerably better, i.e. they exhibit a significantly smaller decrease in the HR on exposure to light or UV.

The construction of the MLC display according to the invention from polarisers, electrode base plates and surface-treated electrodes corresponds to the usual design for displays of this type. The term usual design is broadly drawn here and also encompasses all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se, for example by mixing one or more compounds of the formulae IA and IB with one or more compounds of the formulae II-XXVIII or with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, UV stabilisers, such as Tinuvin®, e.g. Tinuvin® 770, from Ciba Chemicals, antioxidants, e.g. TEMPOL, microparticles, free-radical scavengers, nanoparticles, etc. For example, 0-15% of pleochroic dyes or chiral dopants can be added. Suitable stabilisers and dopants are mentioned below in Tables C and D.

Polymerisable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture. These mixtures may optionally also comprise an initiator, as described, for example, in U.S. Pat. No. 6,781,665. The initiator, for example Irganox-1076 from Ciba, is preferably added to the mixture comprising polymerisable compounds in amounts of 0-1%. Mixtures of this type can be used for so-called polymer-stabilised (PS) modes, in which polymerisation of the reactive mesogens is intended to take place in the liquid-crystalline mixture, for example for PS-IPS, PS-FFS, PS-TN, PS-VA-IPS. The prerequisite for this is that the liquid-crystal mixture does not itself comprise any polymerisable components.

In a preferred embodiment of the invention, the polymerisable compounds are selected from the compounds of the formula M $$R^{Ma}\text{-}A^{M1}\text{-}(Z^{M1}\text{-}A^{M2})_{m1}\text{-}R^{Mb} \qquad M$$

in which the individual radicals have the following meanings:

R$^{Ma}$ and R$^{Mb}$ each, independently of one another, denote P, P-Sp-, H, halogen, SF$_5$, NO$_2$, an alkyl, alkenyl or alkynyl group, where at least one of the radicals R$^{Ma}$ and R$^{Mb}$ preferably denotes or contains a group P or P-Sp-, P denotes a polymerisable group, Sp denotes a spacer group or a single bond, A$^{M1}$ and A$^{M2}$ each, independently of one another, denote an aromatic, heteroaromatic, alicyclic or heterocyclic group, preferably having 4 to 25 ring atoms, preferably C atoms, which may also encompass or contain fused rings, and which may optionally be mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, OH, CH$_2$OH, halogen, SF$_5$, NO$_2$, an alkyl, alkenyl or alkynyl group, Y$^1$ denotes halogen, Z$^{M1}$ denotes —O—, —S—, —CO—, —CO—O—, —COO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond, R$^0$ and R$^{00}$ each, independently of one another, denote H or alkyl having 1 to 12 C atoms, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one, preferably one, two or three, particularly preferably one or two, from the group R$^{Ma}$, R$^{Mb}$ and the substituents L present denotes a group P or P-Sp- or contains at least one group P or P-Sp-.

Particularly preferred compounds of the formula M are those in which

R$^{Ma}$ and R$^{Mb}$ each, independently of one another, denote P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp-, where at least one of the radicals R$^{Ma}$ and R$^{Mb}$ preferably denotes or contains a group P or P-Sp-, A$^{M1}$ and A$^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of R$^{Ma}$ and R$^{Mb}$ or both denote(s) P or P-Sp-.

Suitable and preferred RMs for use in liquid-crystalline media and PS mode displays according to the invention are selected, for example, from the following formulae:

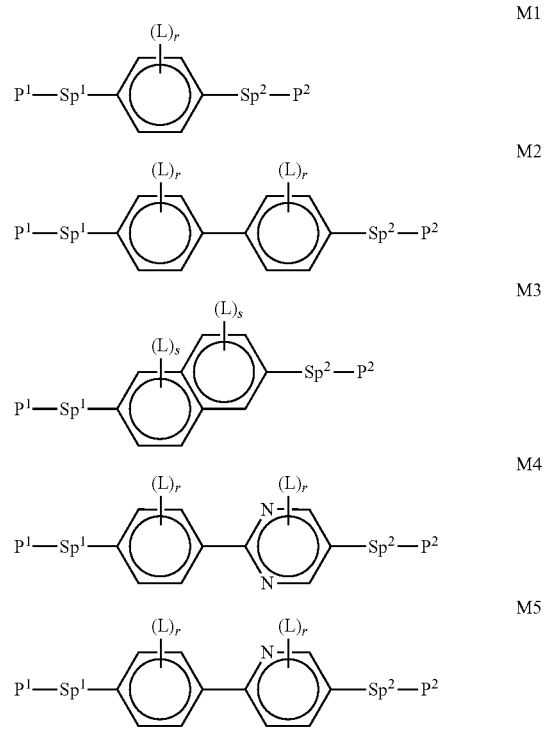

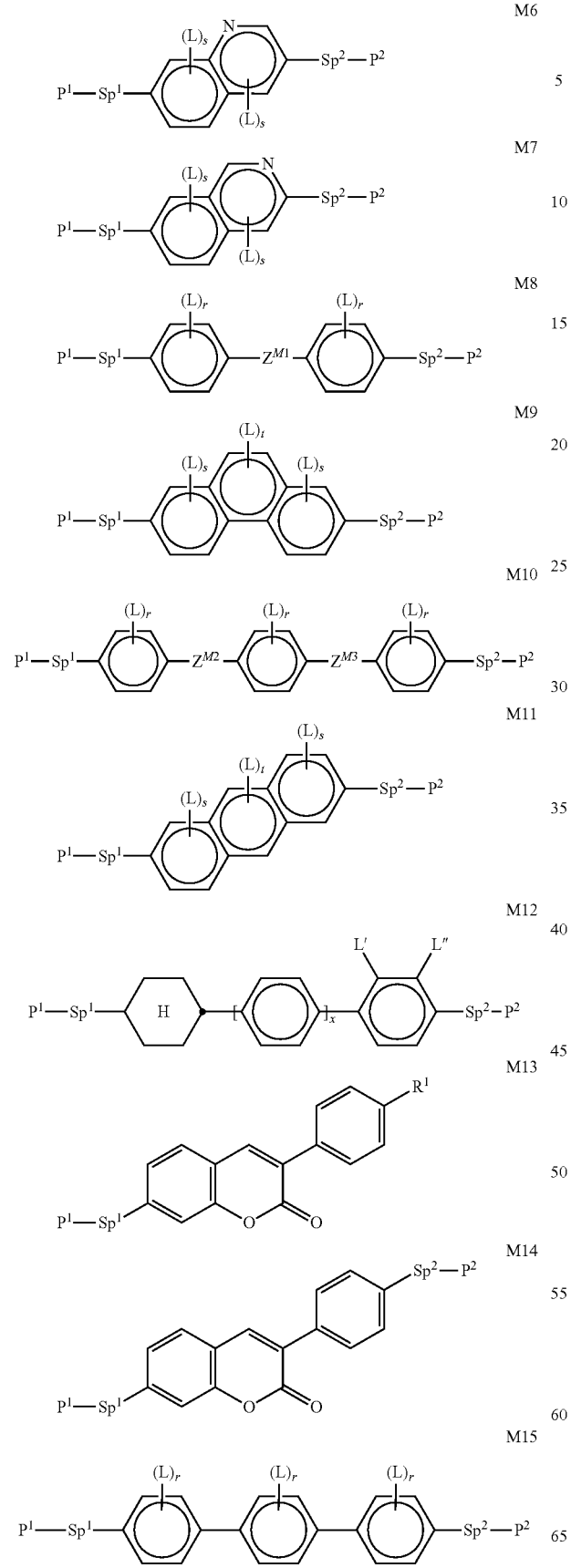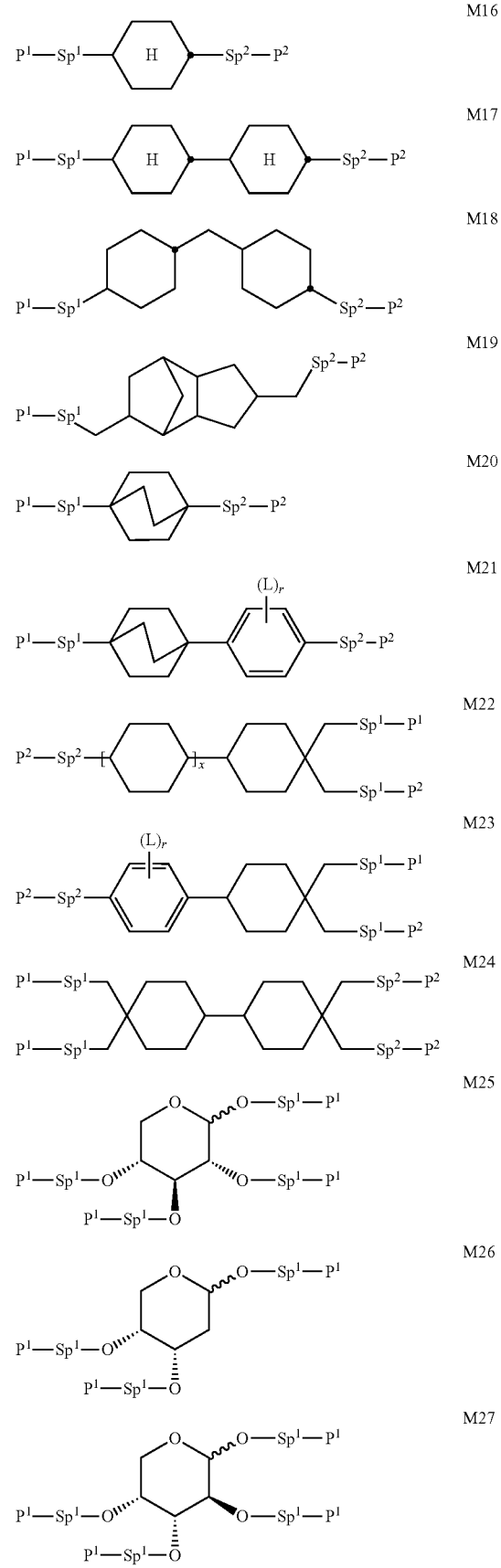

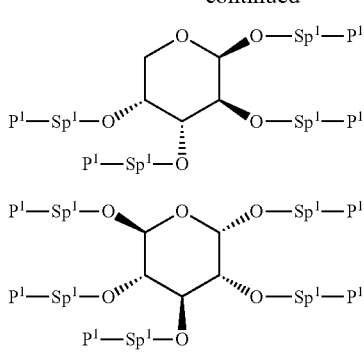

M28

M29 in which the individual radicals have the following meanings:

$P^1$ and $P^2$ each, independently of one another, denote a polymerisable group, preferably having one of the meanings indicated above and below for P, particularly preferably an acrylate, methacrylate, fluoroacrylate, oxetane, vinyloxy or epoxy group, $Sp^1$ and $Sp^2$ each, independently of one another, denote a single bond or a spacer group, preferably having one of the meanings indicated above and below for Sp, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking of the last-mentioned groups to the adjacent ring takes place via the O atom, where one of the radicals $P^1$-$Sp^1$- and $P^2$-$Sp^2$- may also denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by —$C(R^0)$=$C(R^{00})$—, —C≡C—, —$N(R^0)$—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^0$, $R^{00}$ each, independently of one another and on each occurrence identically or differently, denote H or alkyl having 1 to 12 C atoms, $R^y$ and $R^z$ each, independently of one another, denote H, F, $CH_3$ or $CF_3$, $Z^{M1}$ denotes —O—, —CO—, —$C(R^y R^z)$— or —$CF_2CF_2$—, $Z^{M2}$ and $Z^{M3}$ each, independently of one another, denote- CO—O—, —O—CO—, —$CH_2$O—, —$OCH_2$—, —$CF_2$O—, —$OCF_2$— or —$(CH_2)_n$—, where n is 2, 3 or 4, L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

Suitable polymerisable compounds are listed, for example, in Table E.

The liquid-crystalline media in accordance with the present application preferably comprise in total 0.01 to 10%, preferably 0.2 to 4.0%, particularly preferably 0.2 to 2.0%, of polymerisable compounds.

Particular preference is given to the polymerisable compounds of the formula M.

The present invention thus also relates to the use of the mixtures according to the invention in electro-optical displays and to the use of the mixtures according to the invention in shutter glasses, in particular for 3D applications, and in TN, PS-TN, STN, TN-TFT, OCB, IPS, PS-IPS, FFS, PS-FFS and PS-VA-IPS displays.

In the present application and in the examples below, the structures of the liquid-crystal compounds are indicated by means of acronyms, the trans-formation into chemical formulae taking place in accordance with Table A. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are shown in Tables A and B.
TABLE A
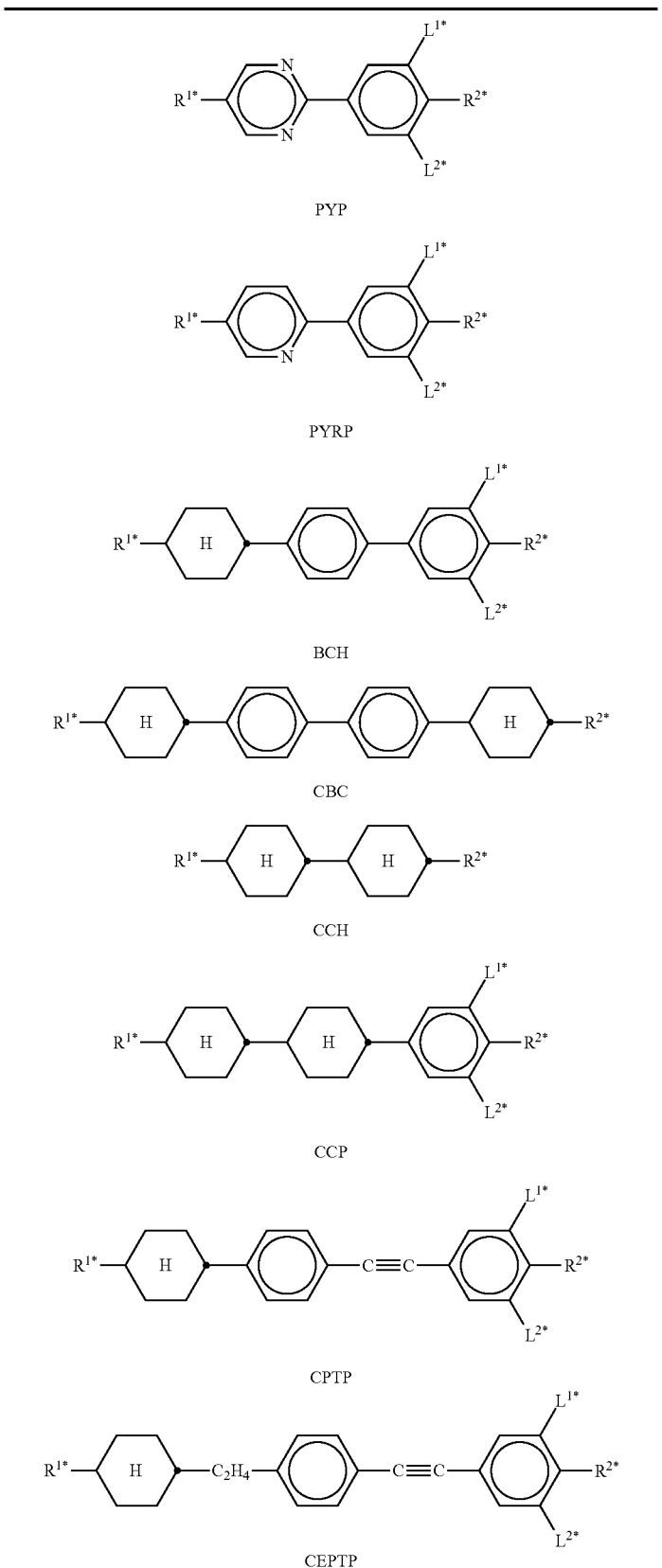

TABLE A-continued
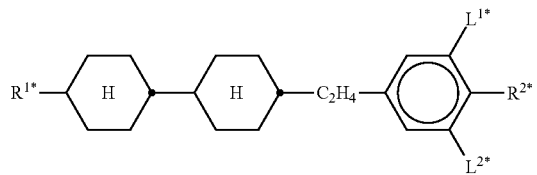
ECCP
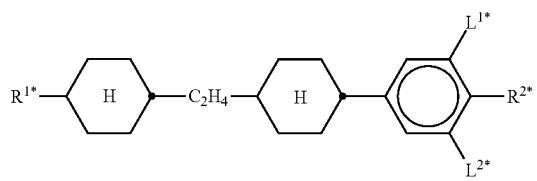
CECP
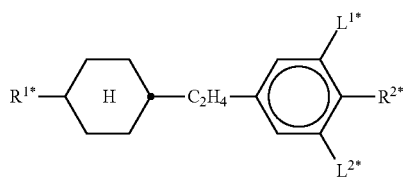
EPCH
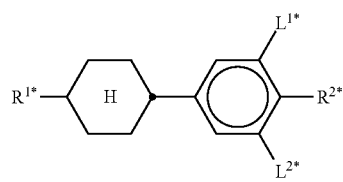
PCH
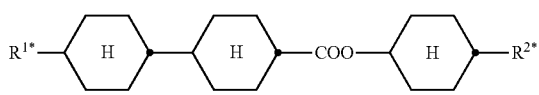
CH
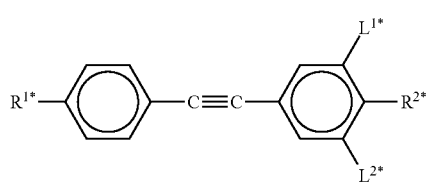
PTP
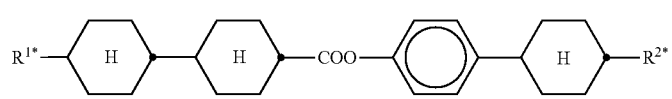
CCPC
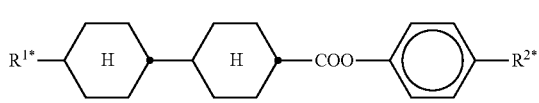
CP TABLE A-continued
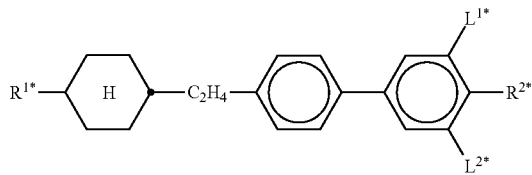
BECH
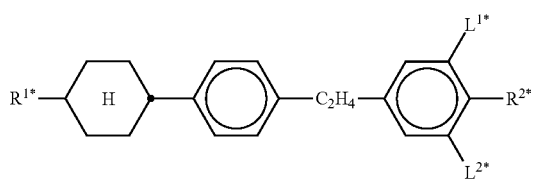
EBCH
CPC
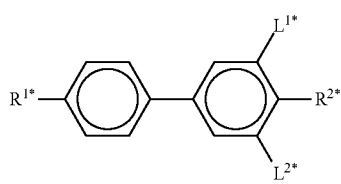
B
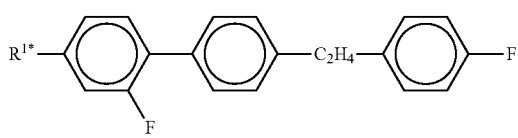
FET-nF
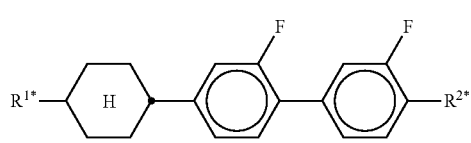
CGG
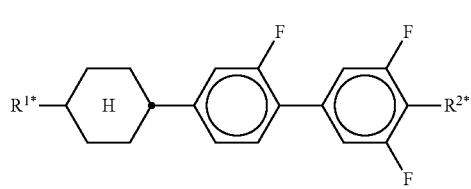
CGU
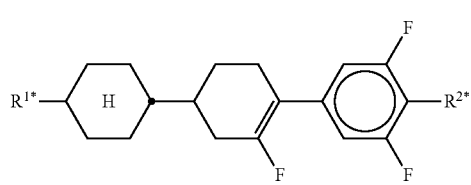
CFU TABLE B
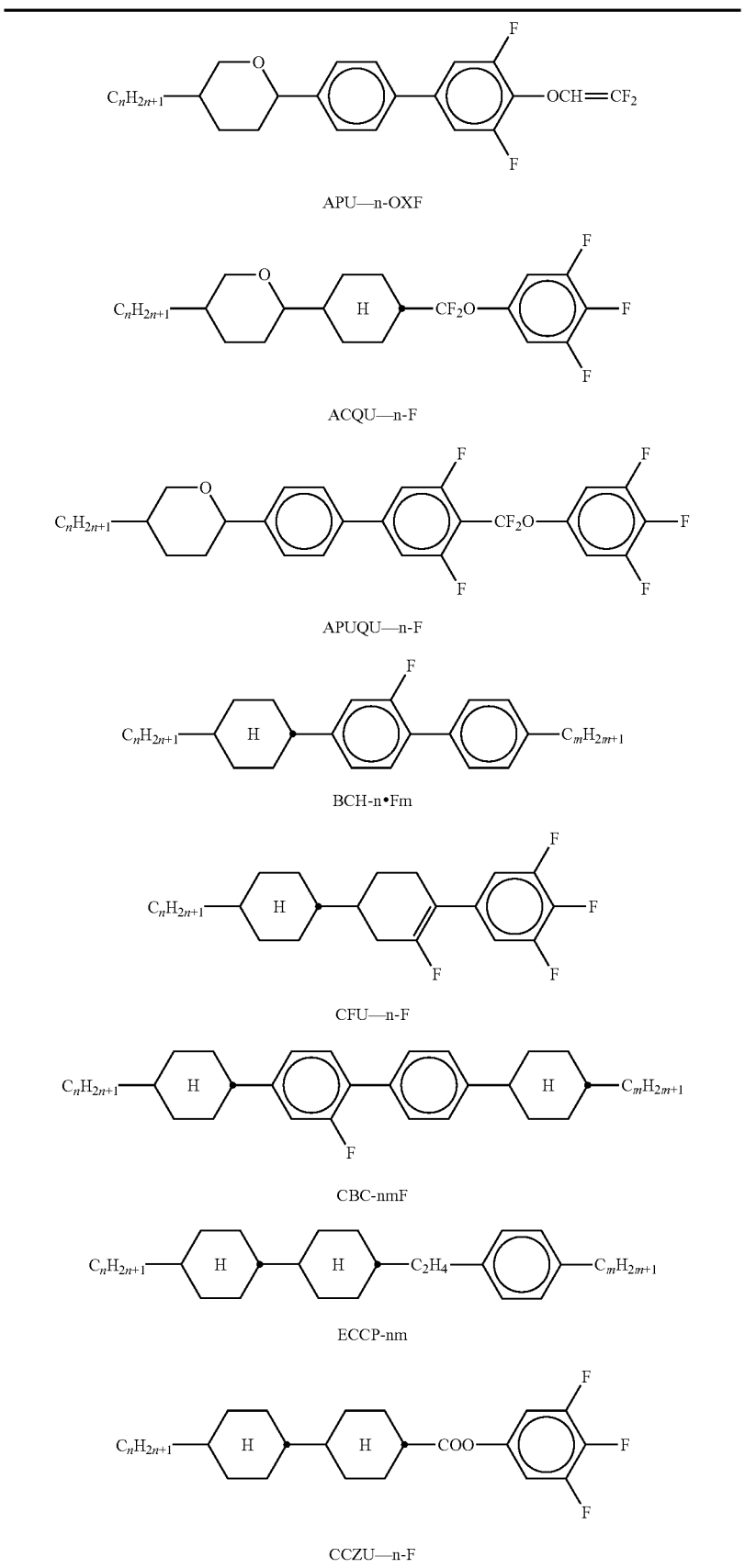

TABLE B-continued
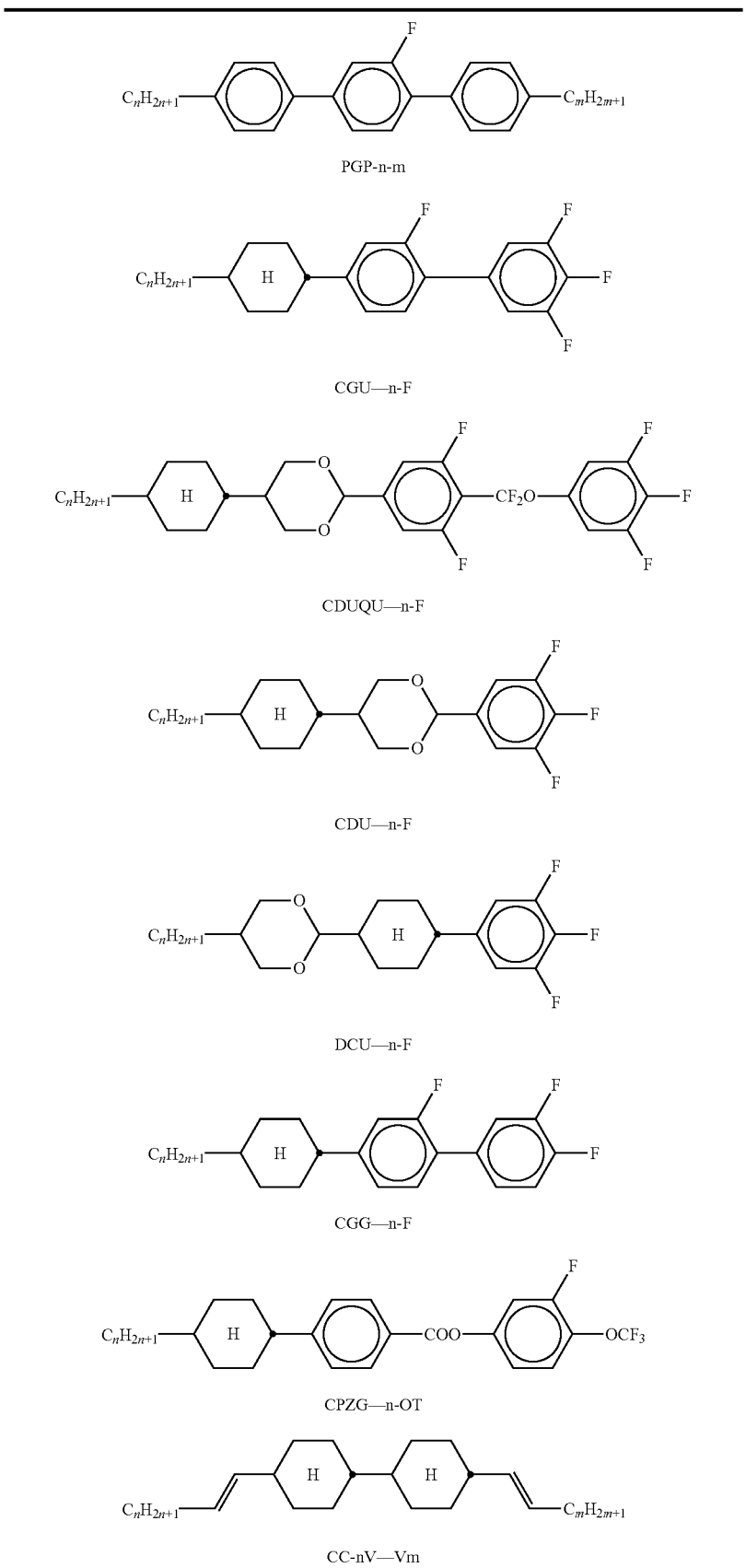

TABLE B-continued
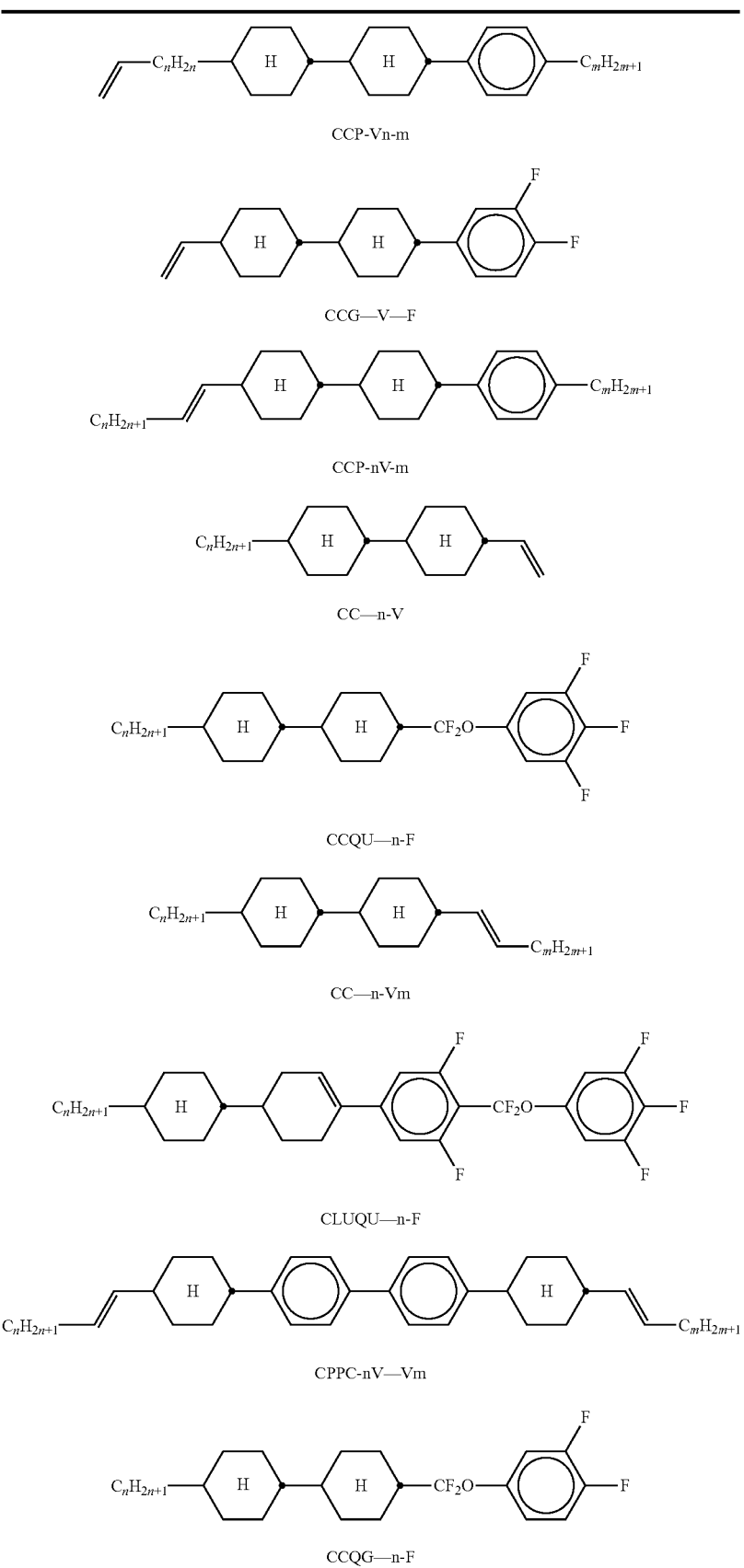

TABLE B-continued
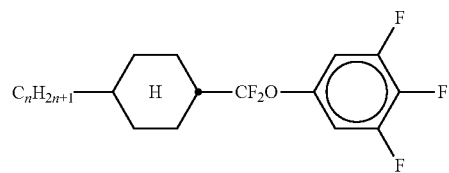
CQU—n-F
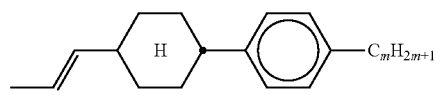
CP—1V-m
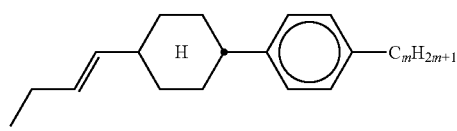
CP—2V-m
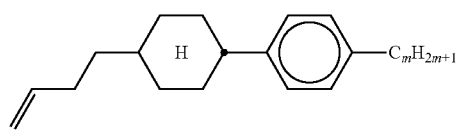
CP—V2-m
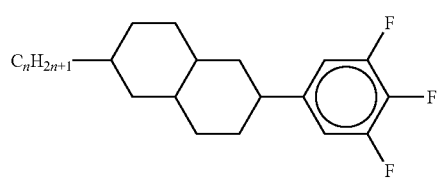
Dec-U—n-F
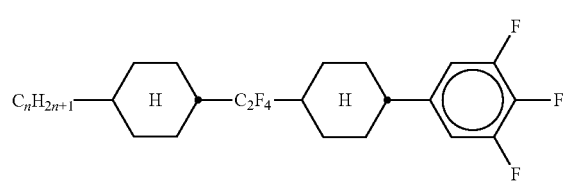
CWCU—n-F
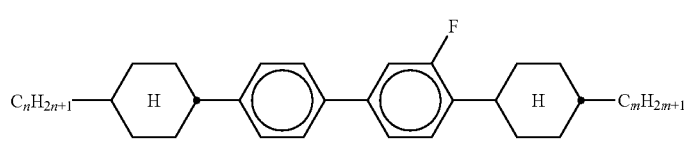
CPGP-n-m
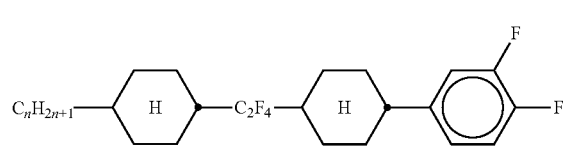
CWCG—n-F TABLE B-continued
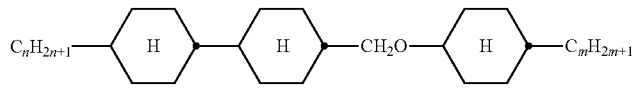
CCOC-n-m
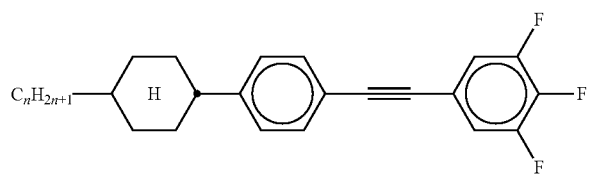
CPTU—n-F
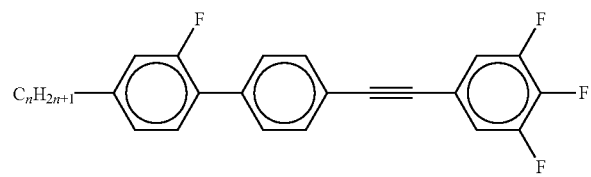
GPTU—n-F
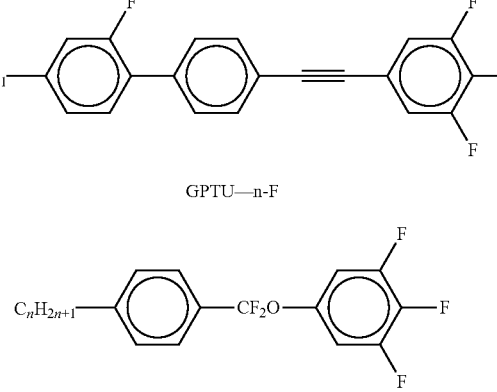
PQU—n-F
PUQU—n-F
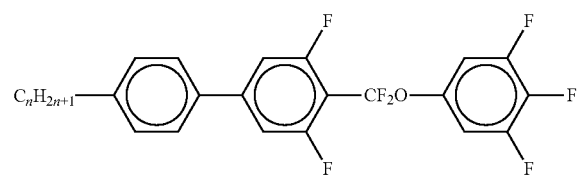
PGU—n-F
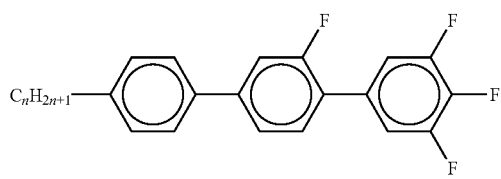
CGZP—n-OT
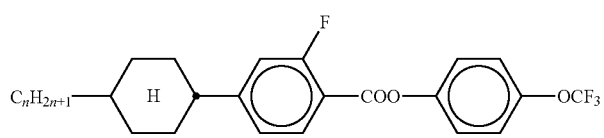
CCGU—n-F TABLE B-continued
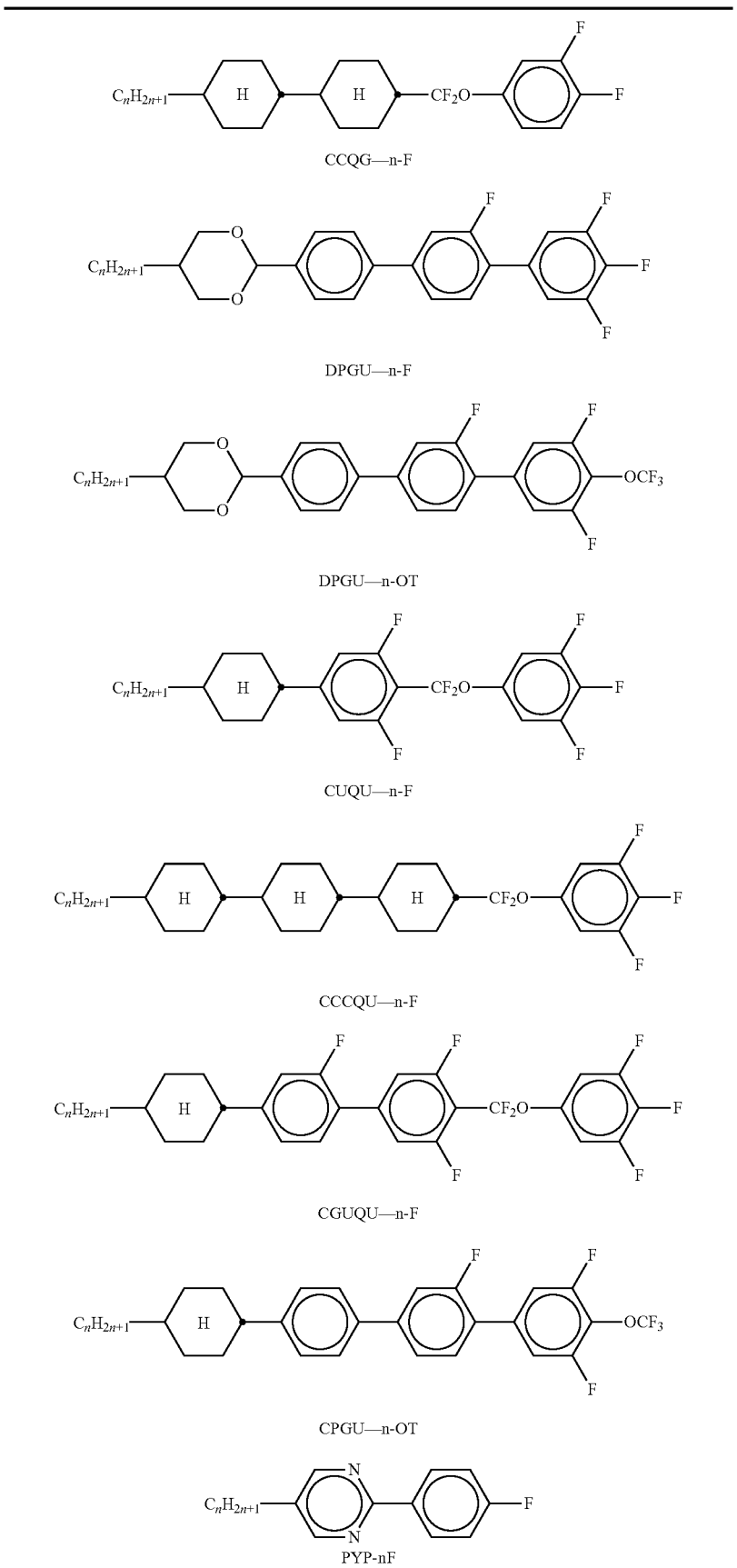

TABLE B-continued
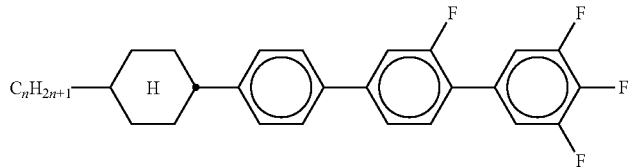
CPGU—n-F
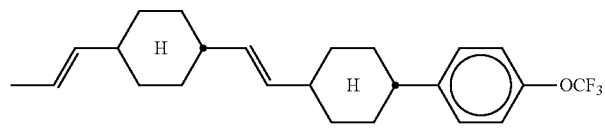
CVCP—1V—OT
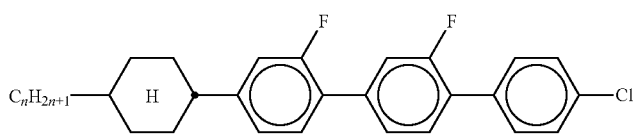
GGP—n-Cl
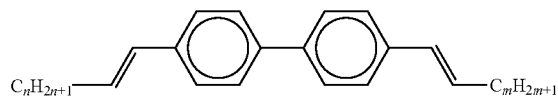
PP-nV—Vm
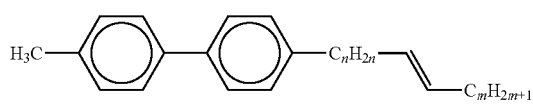
PP-1-nVm
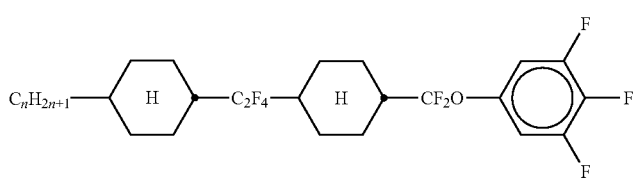
CWCQU—n-F
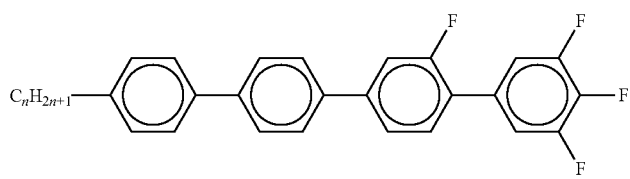
PPGU—n-F
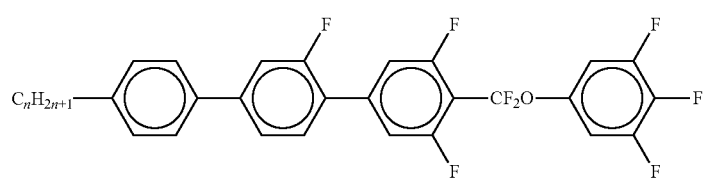
PGUQU—n-F TABLE B-continued
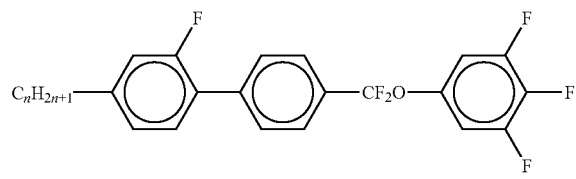
GPQU—n-F
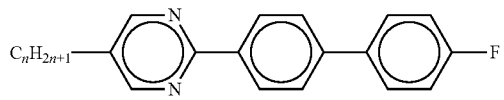
MPP—n-F
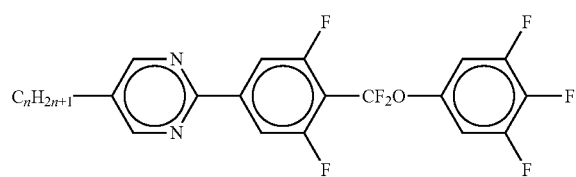
MUQU—n-F
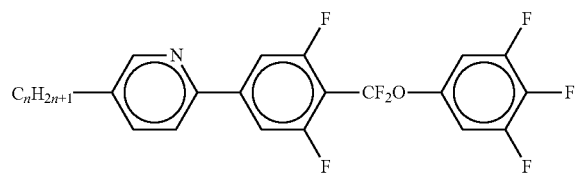
NUQU—n-F
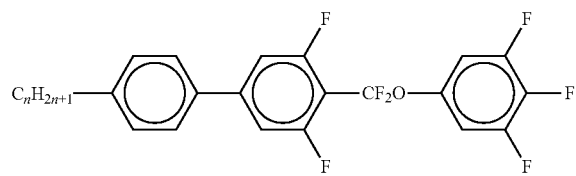
PGP-n-kVm
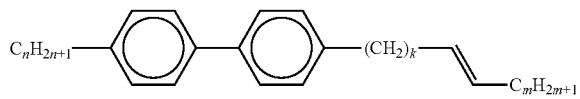
PP-n-kVm
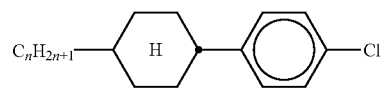
PCH-nCl
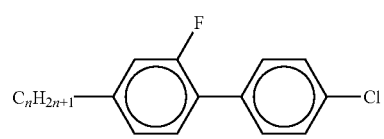
GP—n-Cl TABLE B-continued
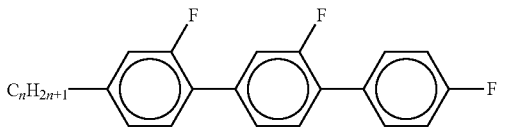
GGP—n-F
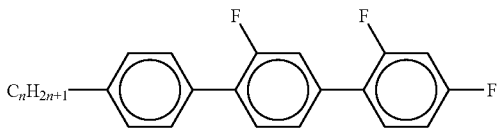
PGIGI—n-F
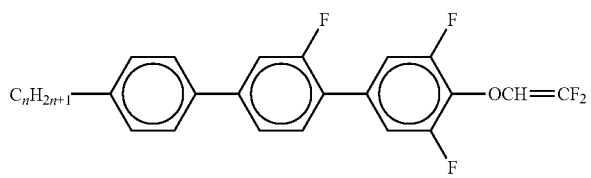
PGU—n-OXF
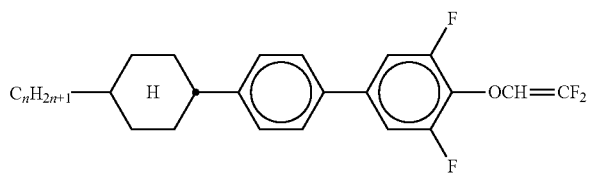
CPU—n-OXF
In the following formulae, n and m each, independently of one another, denote 0, 1, 2, 3, 4, 5, 6, 7, 8, 9, 10, 11 or 12, in particular 2, 3, 5, furthermore 0, 4, 6.
Particular preference is given to liquid-crystalline mixtures which, besides the compounds of the formulae IA and IB, comprise at least one, two, three, four or more compounds from Table B.
TABLE C
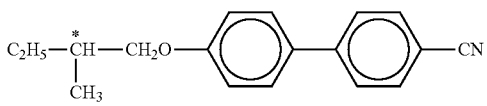
C 15
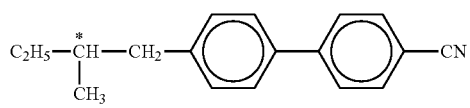
CB 15
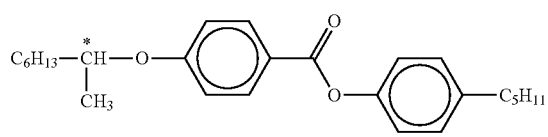
CM 21

TABLE C-continued
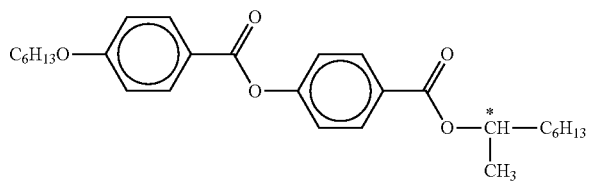
R/S-811
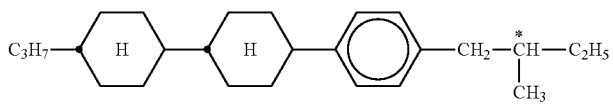
CM 44
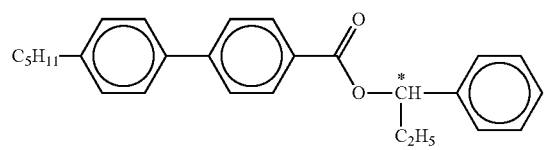
CM 45
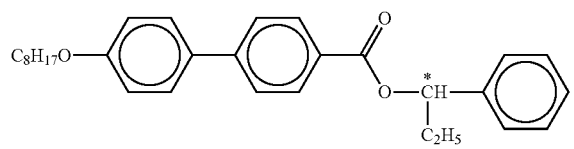
CM 47
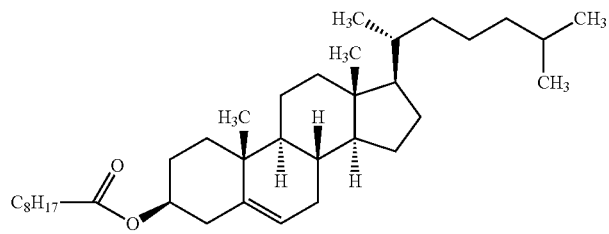
CN
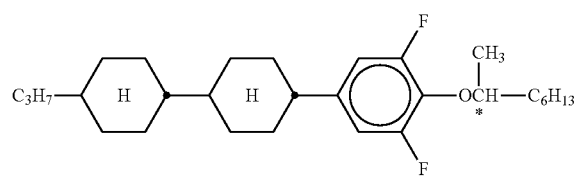
R/S-2011
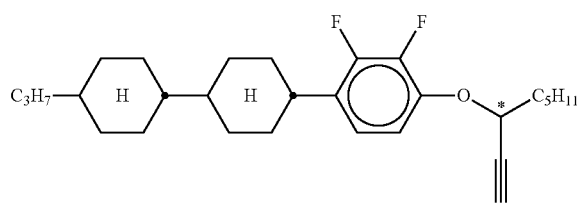
R/S-3011

TABLE C-continued
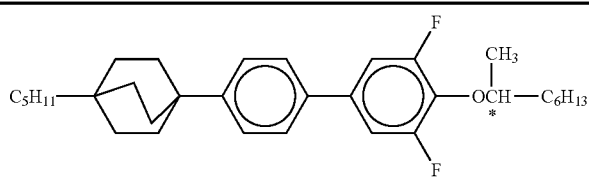
R/S-4011
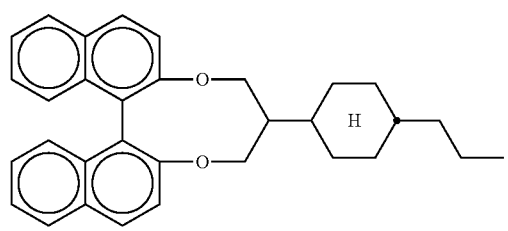
R/S-5011
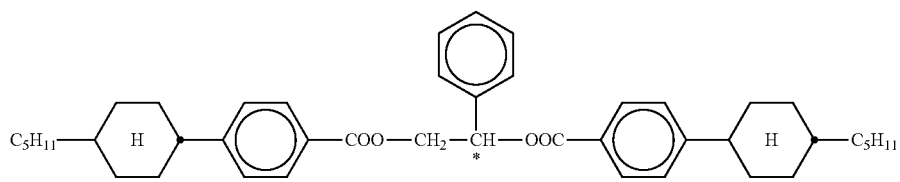
R/S-1011
Table C indicates possible dopants which are generally added to the mixtures according to the invention. The mixtures preferably comprise 0-10% by weight, in particular 0.01-5% by weight and particularly preferably 0.01-3% by weight of dopants.
TABLE D
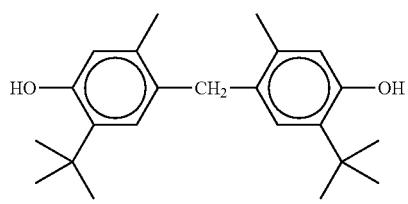
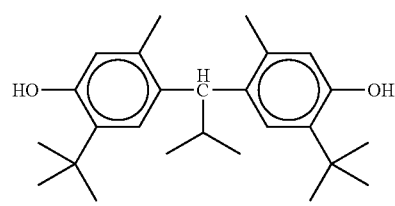
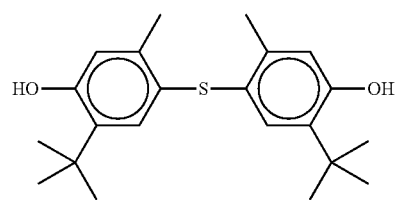

TABLE D-continued
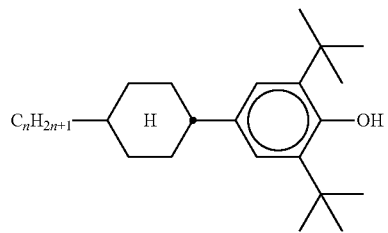
n = 1, 2, 3, 4, 5, 6 or 7
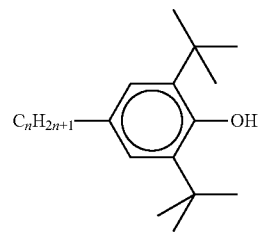
n = 1, 2, 3, 4, 5, 6 or 7
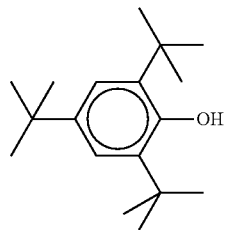
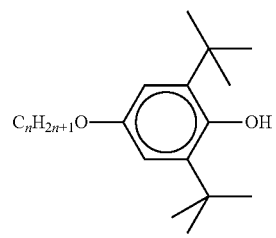
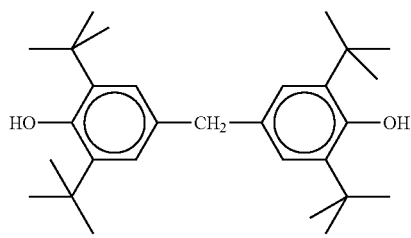
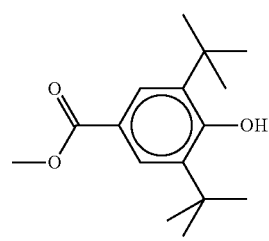

TABLE D-continued
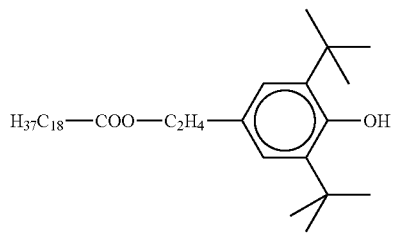
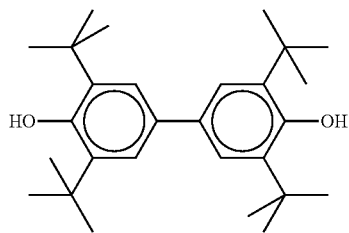
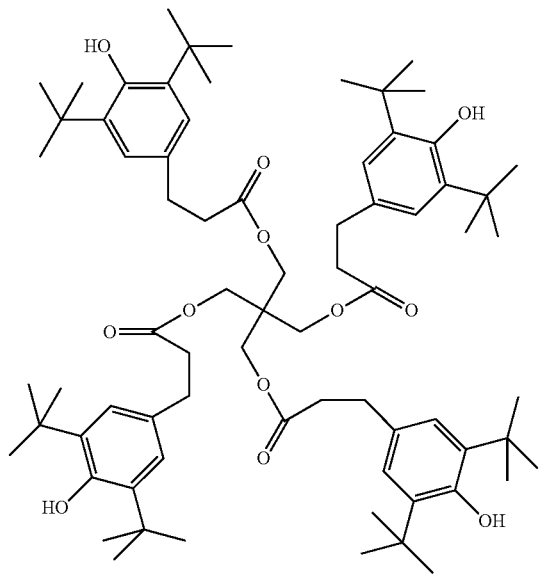 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
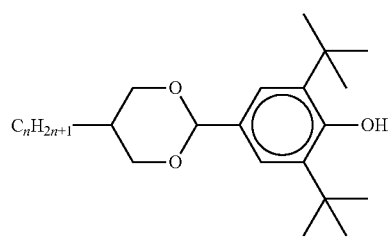
n = 1, 2, 3, 4, 5, 6 or 7
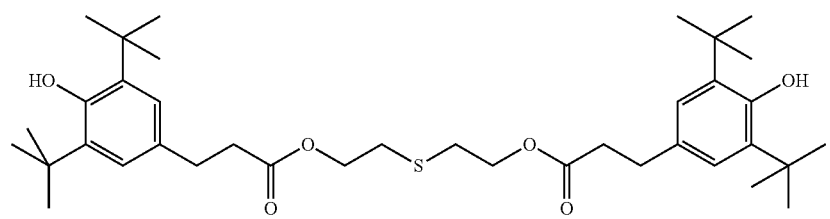 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE D-continued
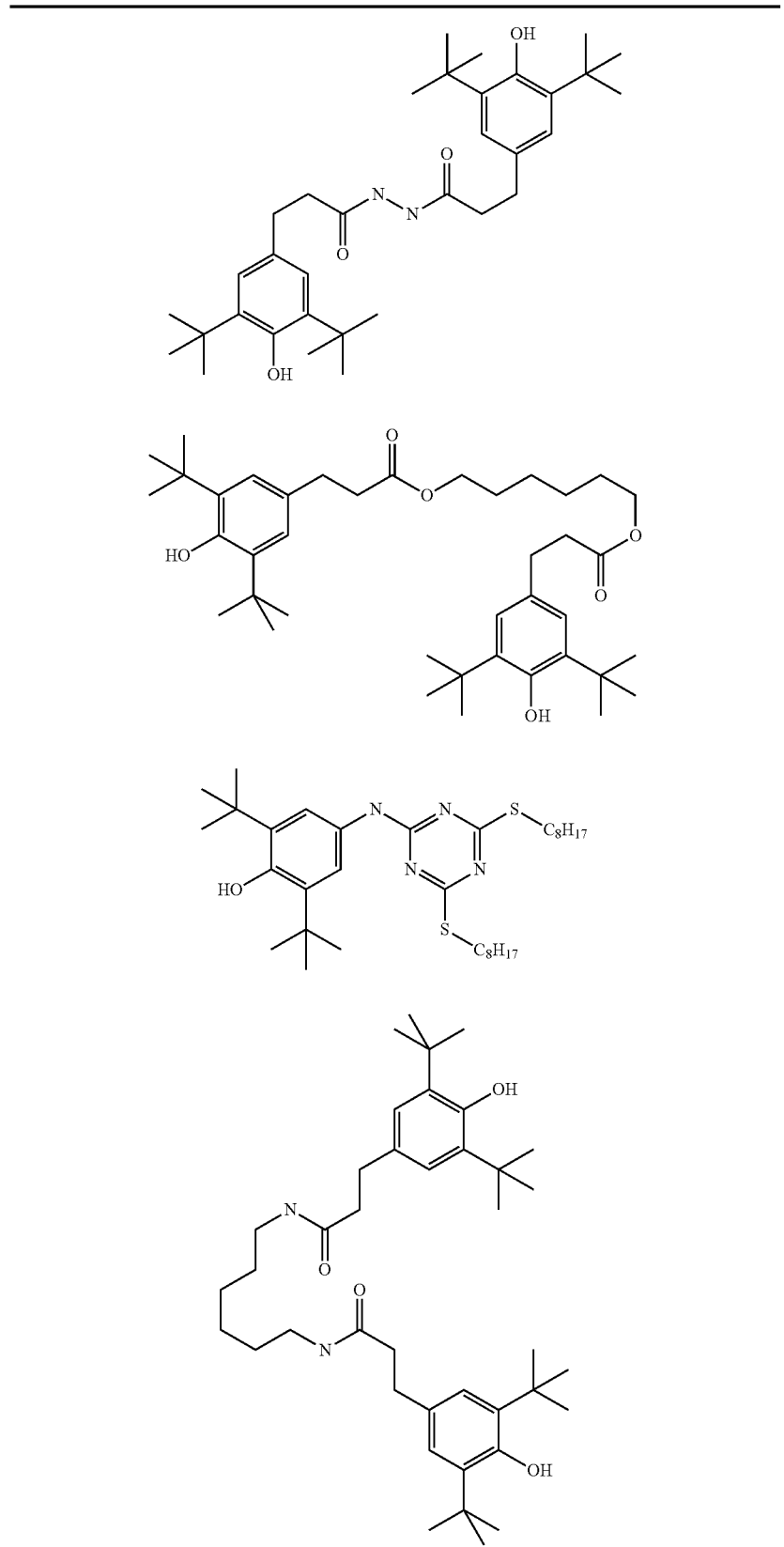

TABLE D-continued
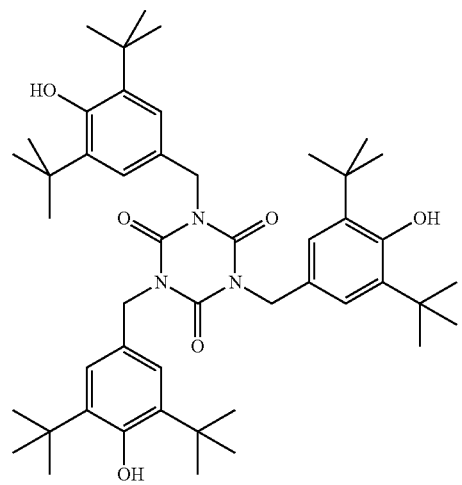 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
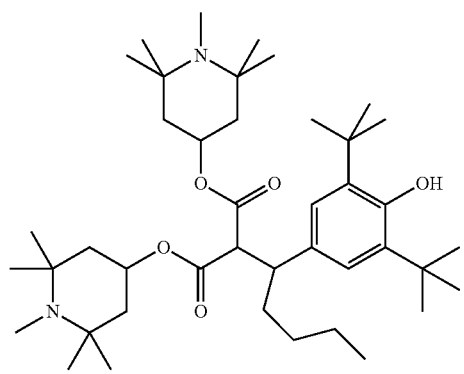 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
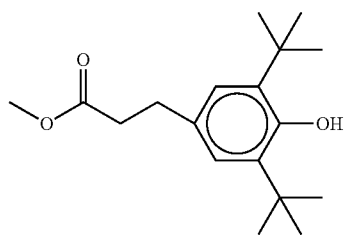
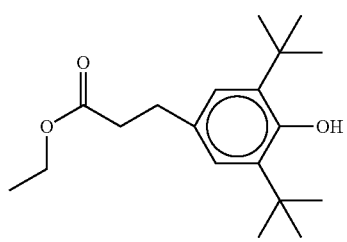
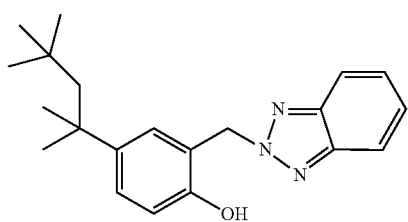 [SMILES: CC(C)(C)CC(C)(C)c1ccc(O)c(Cn2nc3ccccc3n2)c1]

TABLE D-continued
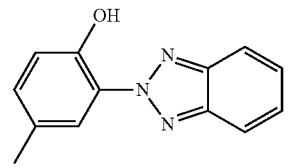 [SMILES: Cc1ccc(O)c(-n2nc3ccccc3n2)c1]
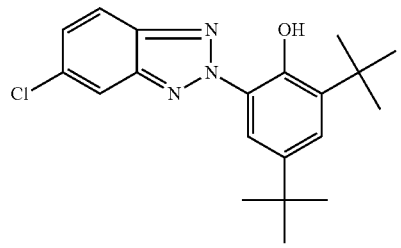 [SMILES: CC(C)(C)c1cc(-n2nc3ccc(Cl)cc3n2)c(O)c(C(C)(C)C)c1]
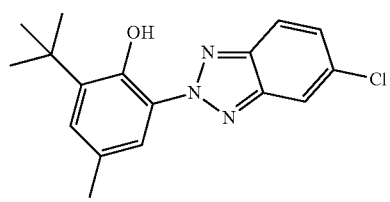 [SMILES: Cc1cc(-n2nc3ccc(Cl)cc3n2)c(O)c(C(C)(C)C)c1]
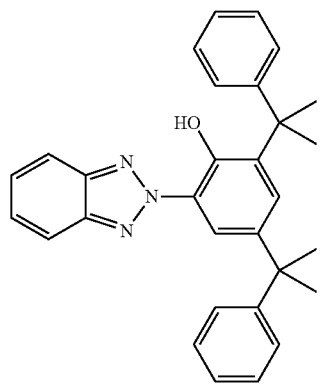 [SMILES: CC(C)(c1ccccc1)c1cc(-n2nc3ccccc3n2)c(O)c(C(C)(C)c2ccccc2)c1]
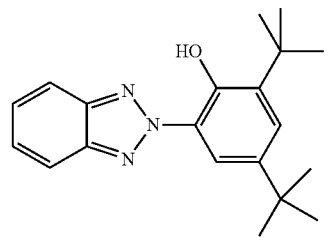 [SMILES: CC(C)(C)c1cc(-n2nc3ccccc3n2)c(O)c(C(C)(C)C)c1]
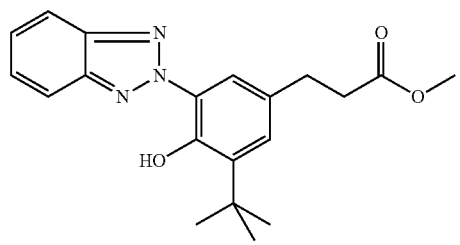 [SMILES: COC(=O)CCc1cc(-n2nc3ccccc3n2)c(O)c(C(C)(C)C)c1]

TABLE D-continued
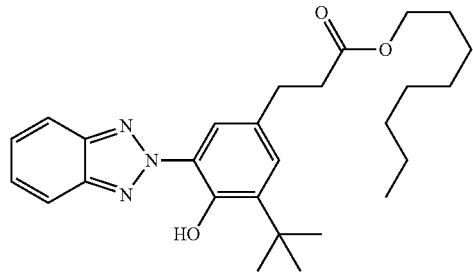 [SMILES: CCCCCCCCOC(=O)CCc1cc(-n2nc3ccccc3n2)c(O)c(C(C)(C)C)c1]
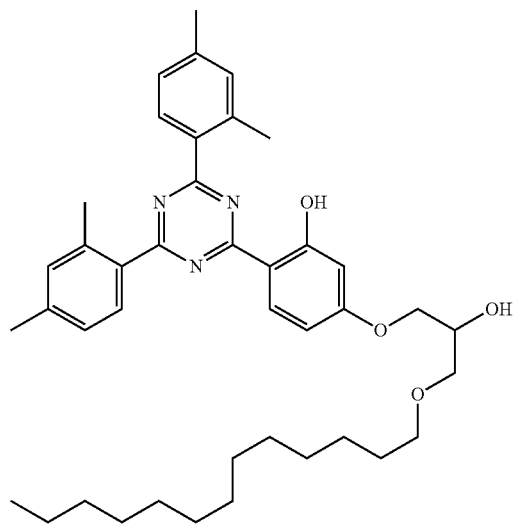 [SMILES: CCCCCCCCCCCCCOCC(O)COc1ccc(-c2nc(-c3ccc(C)cc3C)nc(-c3ccc(C)cc3C)n2)c(O)c1]
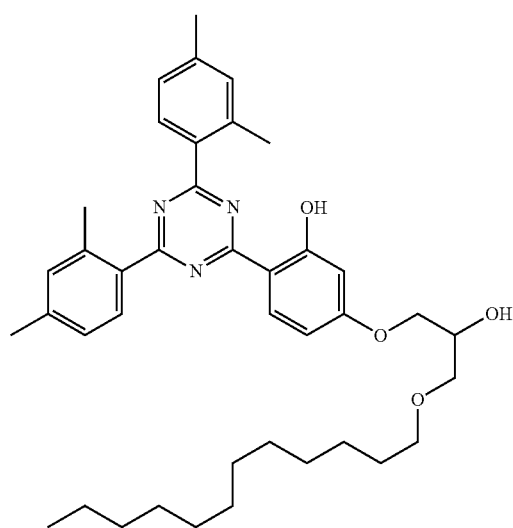 [SMILES: CCCCCCCCCCCCOCC(O)COc1ccc(-c2nc(-c3ccc(C)cc3C)nc(-c3ccc(C)cc3C)n2)c(O)c1]

TABLE D-continued
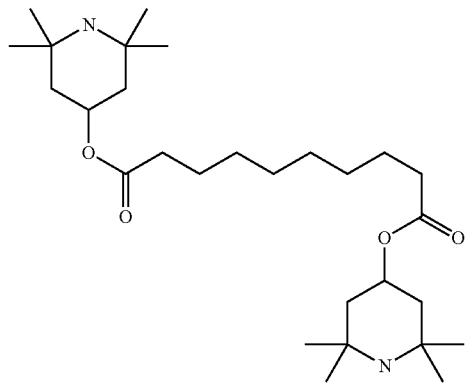
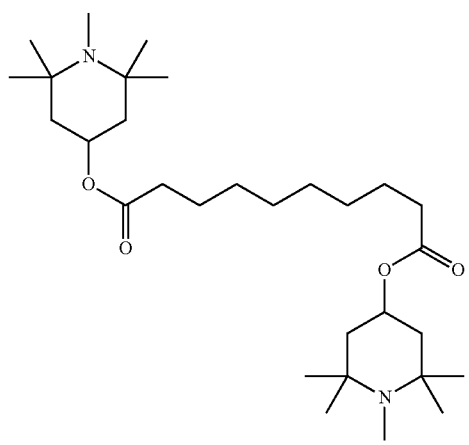
Stabilisers, which can be added, for example, to the mixtures according to the invention in amounts of 0-10% by weight, are mentioned below.
TABLE E
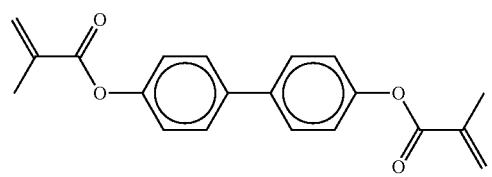
RM-1
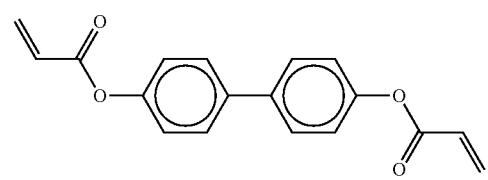
RM-2

TABLE E-continued
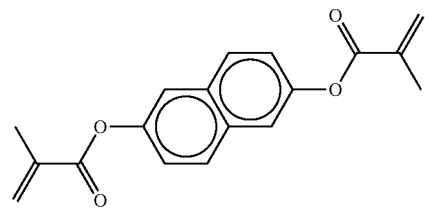
RM-3
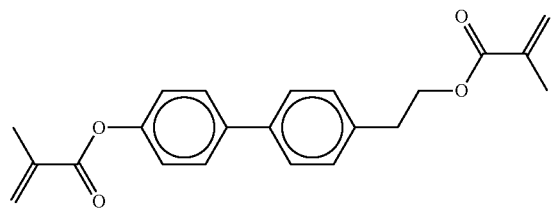
RM-4
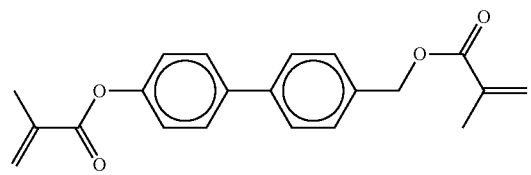
RM-5
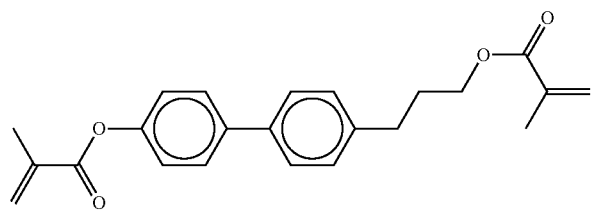
RM-6
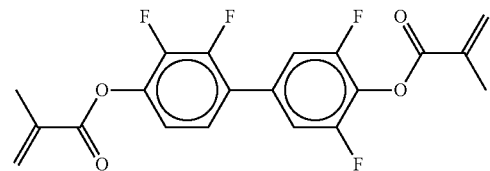
RM-7
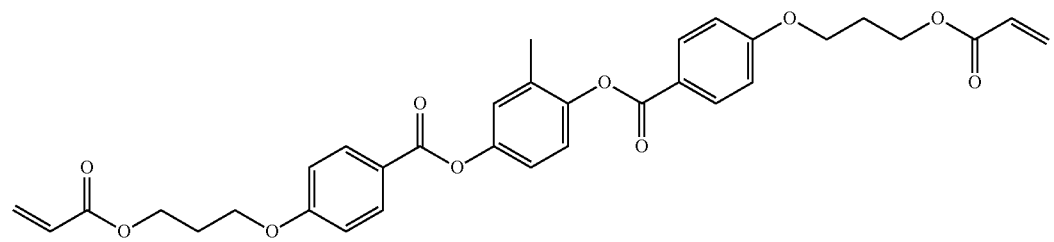 [SMILES: C=CC(=O)OCCCOc1ccc(C(=O)Oc2ccc(OC(=O)c3ccc(OCCCOC(=O)C=C)cc3)c(C)c2)cc1]
RM-8

TABLE E-continued
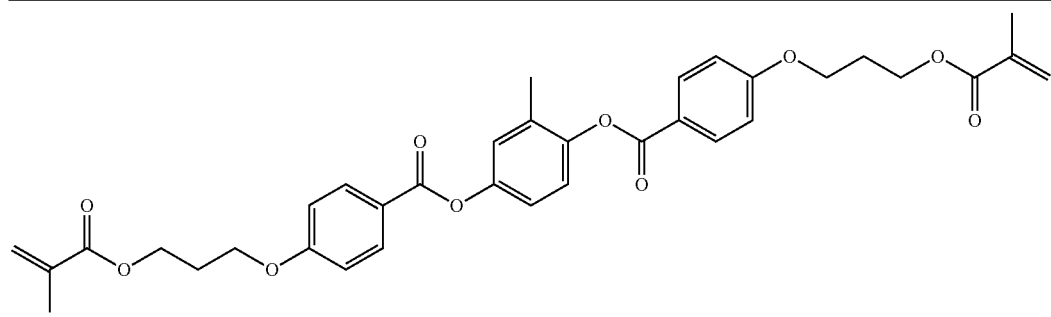
RM-9
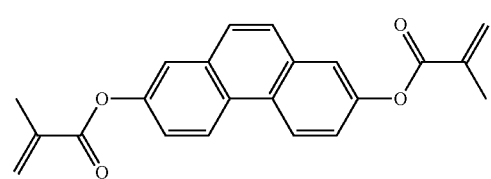 [SMILES: C=C(C)C(=O)Oc1ccc2c(ccc3cc(OC(=O)C(=C)C)ccc32)c1]
RM-10
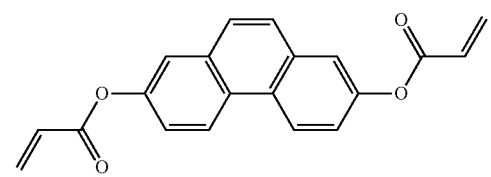 [SMILES: C=CC(=O)Oc1ccc2c(ccc3cc(OC(=O)C=C)ccc32)c1]
RM-11
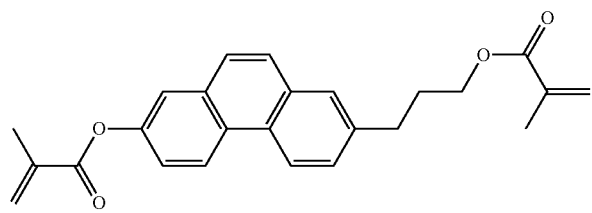 [SMILES: C=C(C)C(=O)OCCCc1ccc2c(ccc3cc(OC(=O)C(=C)C)ccc32)c1]
RM-12
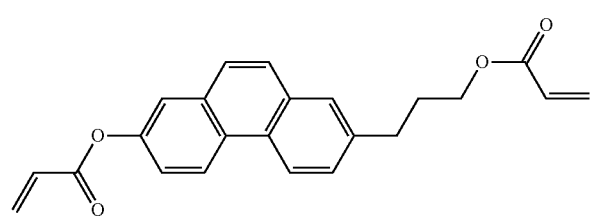 [SMILES: C=CC(=O)OCCCc1ccc2c(ccc3cc(OC(=O)C=C)ccc32)c1]
RM-13
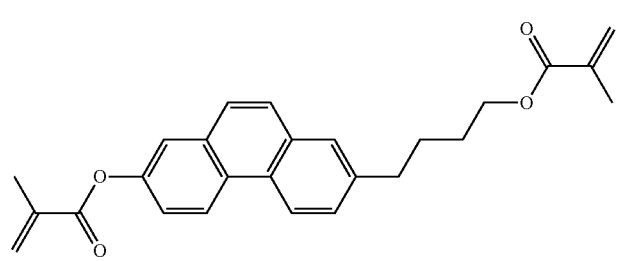 [SMILES: C=C(C)C(=O)OCCCCc1ccc2c(ccc3cc(OC(=O)C(=C)C)ccc32)c1]
RM-14

TABLE E-continued
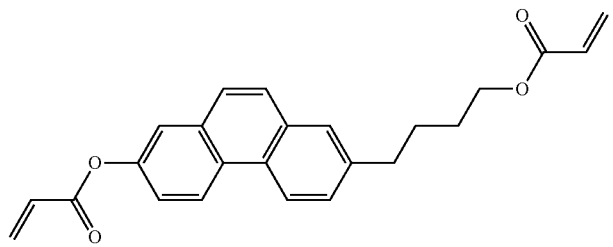 [SMILES: C=CC(=O)OCCCCc1ccc2c(ccc3cc(OC(=O)C=C)ccc32)c1]
RM-15
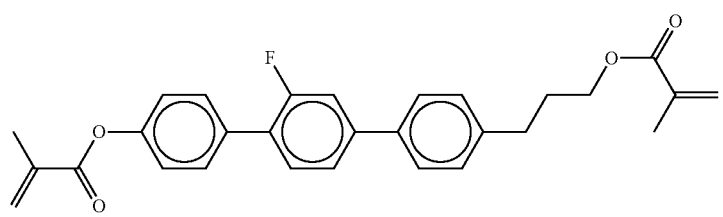
RM-16
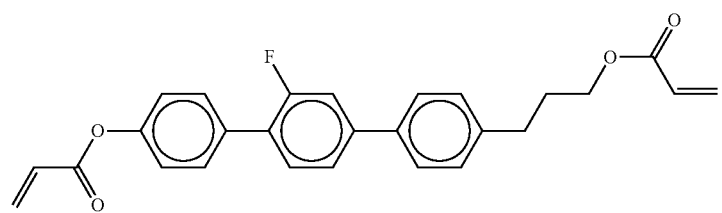
RM-17
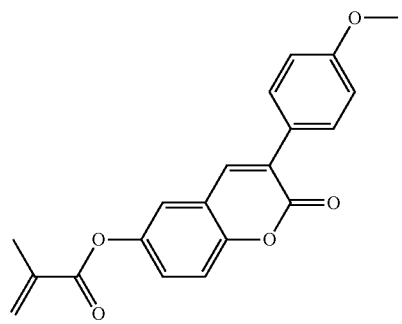 [SMILES: C=C(C)C(=O)Oc1ccc2oc(=O)c(-c3ccc(OC)cc3)cc2c1]
RM-18
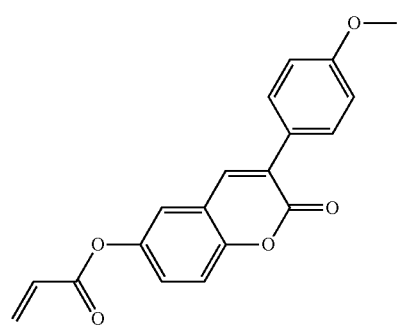 [SMILES: C=CC(=O)Oc1ccc2oc(=O)c(-c3ccc(OC)cc3)cc2c1]
RM-19

TABLE E-continued
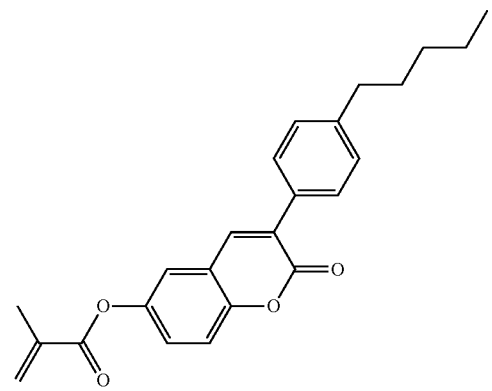 [SMILES: C=C(C)C(=O)Oc1ccc2oc(=O)c(-c3ccc(CCCCC)cc3)cc2c1]
RM-20
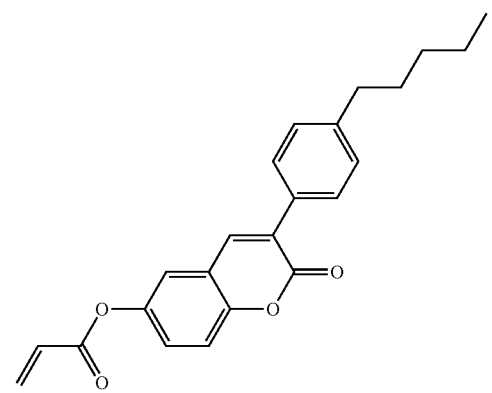 [SMILES: C=CC(=O)Oc1ccc2oc(=O)c(-c3ccc(CCCCC)cc3)cc2c1]
RM-21
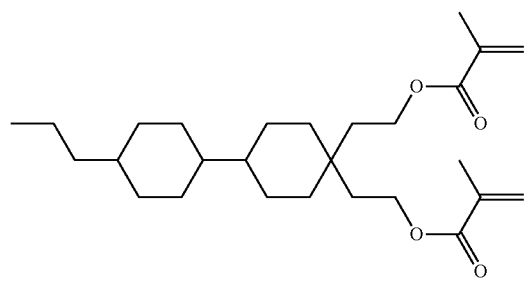 [SMILES: C=C(C)C(=O)OCCC1(CCOC(=O)C(=C)C)CCC(C2CCC(CCC)CC2)CC1]
RM-22
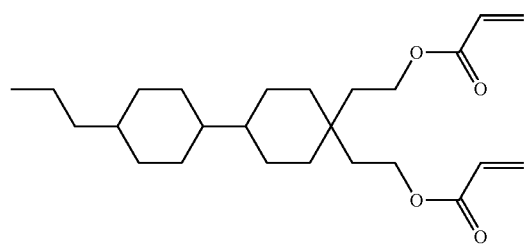 [SMILES: C=CC(=O)OCCC1(CCOC(=O)C=C)CCC(C2CCC(CCC)CC2)CC1]
RM-23

TABLE E-continued
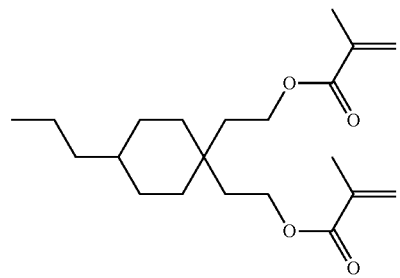 [SMILES: C=C(C)C(=O)OCCC1(CCOC(=O)C(=C)C)CCC(CCC)CC1]
RM-24
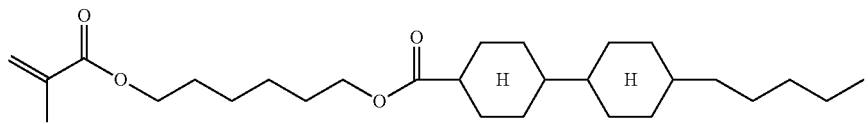
RM-25
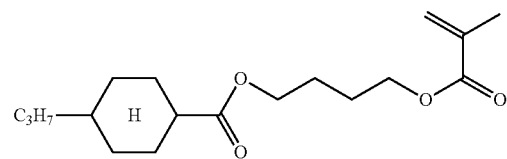
RM-26
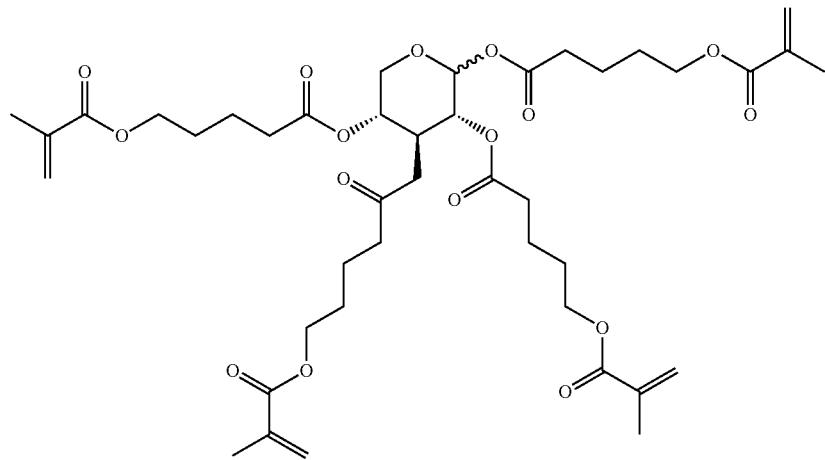 [SMILES: C=C(C)C(=O)OCCCCC(=O)C[C@H]1[C@H](OC(=O)CCCCOC(=O)C(=C)C)COC(OC(=O)CCCCOC(=O)C(=C)C)[C@@H]1OC(=O)CCCCOC(=O)C(=C)C]
RM-27

TABLE E-continued
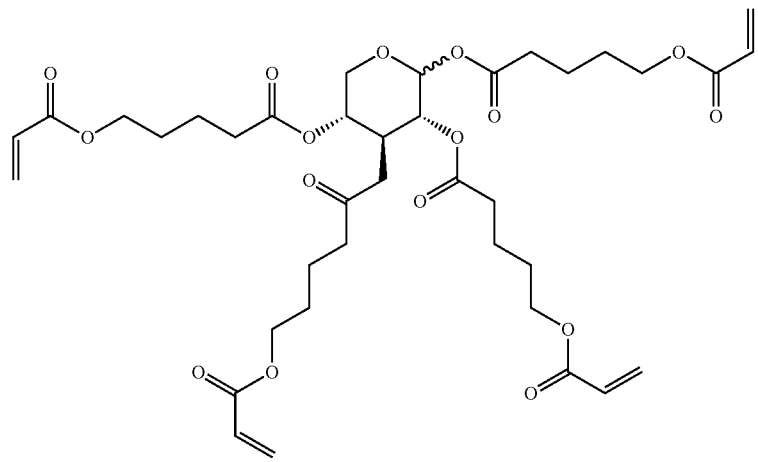 [SMILES: C=CC(=O)OCCCCC(=O)C[C@H]1[C@H](OC(=O)CCCCOC(=O)C=C)COC(OC(=O)CCCCOC(=O)C=C)[C@@H]1OC(=O)CCCCOC(=O)C=C]
RM-28
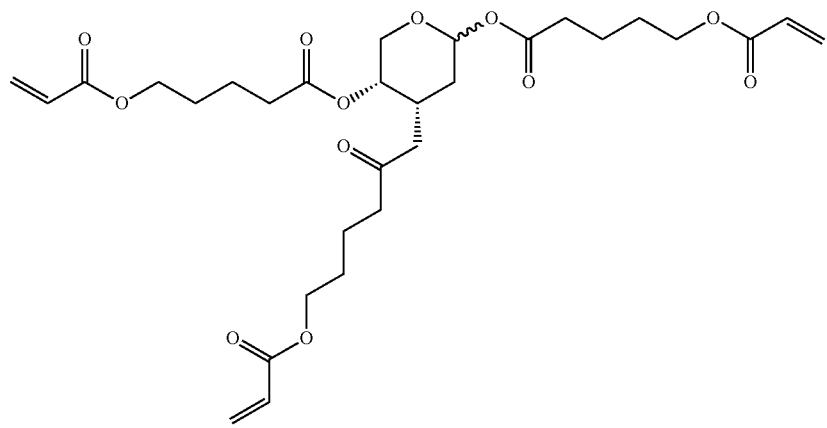 [SMILES: C=CC(=O)OCCCCC(=O)C[C@H]1CC(OC(=O)CCCCOC(=O)C=C)OC[C@H]1OC(=O)CCCCOC(=O)C=C]
RM-29
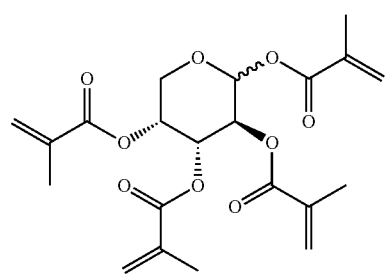 [SMILES: C=C(C)C(=O)OC1OC[C@@H](OC(=O)C(=C)C)[C@@H](OC(=O)C(=C)C)[C@@H]1OC(=O)C(=C)C]
RM-30
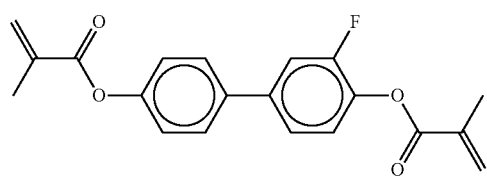
RM-31

TABLE E-continued

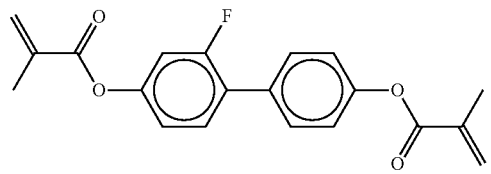

RM-32

Polymerisable compounds, which can be added, for example, to the mixtures according to the invention in amounts of 0.01-1% by weight, are mentioned below. It may also be necessary to add an initiator for the polymerisation, preferably in amounts of 0-1%.

The following mixture examples are intended to explain the invention without limiting it.

Above and below, percentage data denote percent by weight. All temperatures are indicated in degrees Celsius. m.p. denotes melting point, cl.p.=clearing point. Furthermore, C=crystalline state, N=nematic phase, S=smectic phase and I=isotropic phase. The data between these symbols represent the transition temperatures. Furthermore, Δn denotes the optical anisotropy at 589 nm and 20° C., $\gamma_1$ denotes the rotational viscosity (mPa·s) at 20° C., Δε denotes the dielectric anisotropy at 20° C. and 1 kHz (Δε=$\varepsilon_\parallel$-$\varepsilon_\perp$ where $\varepsilon_\parallel$ denotes the dielectric constant parallel to the longitudinal axes of the molecules and $\varepsilon_\perp$ denotes the dielectric constant perpendicular thereto), $V_{10}$ denotes the voltage (V) for 10% transmission (viewing angle perpendicular to the plate surface), (threshold voltage), determined in a TN cell (90 degree twist) at the 1st minimum (i.e. at a dΔn value of 0.5 μm) at 20° C., $V_0$ denotes the capacitively determined Freedericks threshold voltage in an antiparallel-rubbed cell at 20° C.

All physical properties are determined in accordance with "Merck Liquid Crystals, Physical Properties of Liquid Crystals", status November 1997, Merck KGaA, Germany, and apply for a temperature of 20° C., unless explicitly indicated otherwise.

EXAMPLES

Example M1

| | | | |
|---|---|---|---|
| CC-3-V | 28.0% | Clearing point [° C.]: | 90.5 |
| CC-3-V1 | 5.5% | Δn [589 nm, 20° C.]: | 0.0991 |
| CCP-V2-1 | 5.0% | Δε [1 kHz, 20° C.]: | 12.5 |
| CCP-30CF$_3$ | 7.0% | $\gamma_1$ [mPa · s, 20° C.]: | 100 |
| CCP-50CF$_3$ | 5.0% | $V_0$ [V]: | 1.10 |
| ACQU-3-F | 2.5% | | |
| CCQU-3-F | 8.0% | | |
| CCQU-5-F | 6.0% | | |
| CCGU-3-F | 4.0% | | |
| PUQU-3-F | 7.5% | | |
| APUQU-2-F | 5.0% | | |
| APUQU-3-F | 7.0% | | |
| PGUQU-3-F | 2.0% | | |
| PGUQU-4-F | 5.0% | | |
| PGUQU-5-F | 2.5% | | |

Example M2

| | | | |
|---|---|---|---|
| CC-3-V | 24.5% | Clearing point [° C.]: | 95 |
| CC-3-V1 | 7.0% | Δn [589 nm, 20° C.]: | 0.0996 |
| CCP-V2-1 | 6.0% | Δε [1 kHz, 20° C.]: | 11.0 |
| CCP-V-1 | 8.0% | $\gamma_1$ [mPa · , 20° C.]: | 98 |
| CCP-30CF$_3$ | 7.0% | $V_0$ [V]: | 1.21 |
| CCP-50CF$_3$ | 5.0% | | |
| CCQU-3-F | 8.0% | | |
| CCQU-5-F | 6.0% | | |
| PUQU-3-F | 7.0% | | |
| APUQU-2-F | 5.0% | | |
| APUQU-3-F | 8.0% | | |
| PGUQU-3-F | 1.5% | | |
| PGUQU-4-F | 7.0% | | |

Example M3

| | | | |
|---|---|---|---|
| CC-3-V | 32.0% | Clearing point [° C.]: | 75.9 |
| CC-3-V1 | 9.0% | Δn [589 nm, 20° C.]: | 0.1258 |
| CCP-V-1 | 5.0% | Δε [1 kHz, 20° C.]: | 16.5 |
| PGP-2-2V | 3.0% | $\gamma_1$ [mPa · s, 20° C.]: | 87 |
| PGU-2-F | 4.0% | $V_0$ [V]: | 0.90 |
| PGU-3-F | 3.5% | | |
| PUQU-3-F | 6.5% | | |
| APUQU-2-F | 5.0% | | |
| APUQU-3-F | 12.0% | | |
| PGUQU-3-F | 5.0% | | |
| PGUQU-4-F | 7.0% | | |
| PGUQU-5-F | 8.0% | | |

Example M4

| | | | |
|---|---|---|---|
| CC-3-V | 27.0% | Clearing point [° C.]: | 74.8 |
| CC-3-V1 | 9.0% | Δn [589 nm, 20° C.]: | 0.1255 |
| CCP-V-1 | 8.5% | Δε [1 kHz, 20° C.]: | 18.6 |
| PGU-2-F | 4.5% | $\gamma_1$ [mPa · s, 20° C.]: | 95 |
| PGU-3-F | 3.0% | $V_0$ [V]: | 0.83 |
| PUQU-3-F | 11.0% | | |
| APUQU-2-F | 5.0% | | |
| APUQU-3-F | 12.0% | | |
| PGUQU-3-F | 5.0% | | |
| PGUQU-4-F | 7.0% | | |
| PGUQU-5-F | 8.0% | | |

Example M5

| | | | |
|---|---|---|---|
| CC-3-V | 30.0% | Clearing point [° C.]: | 94.5 |
| CC-3-V1 | 8.0% | Δn [589 nm, 20° C.]: | 0.0990 |
| CCP-V2-1 | 4.0% | Δε [1 kHz, 20° C.]: | 11.0 |

-continued

| | | | |
|---|---|---|---|
| CCP-V-1 | 8.0% | γ₁ [mPa · s, 20° C.]: | 92 |
| CCP-3OCF₃ | 7.0% | LTS [bulk, −25° C.]: | >1000 h |
| CCQU-3-F | 4.0% | $V_0$ [V]: | 1.22 |
| PUQU-3-F | 5.0% | | |
| APUQU-2-F | 5.0% | | |
| APUQU-3-F | 2.0% | | |
| PGUQU-3-F | 2.0% | | |
| PGUQU-4-F | 5.0% | | |
| PGUQU-5-F | 5.0% | | |
| CDUQU-3-F | 10.0% | | |
| ECCP-31 | 5.0% | | |

Example M6

| | | | |
|---|---|---|---|
| CC-3-V | 37.0% | Clearing point [° C.]: | 80.0 |
| CCP-V-1 | 5.0% | Δn [589 nm, 20° C.]: | 0.1287 |
| PGU-2-F | 3.0% | Δε [1 kHz, 20° C.]: | 17.3 |
| PGU-3-F | 8.0% | γ₁ [mPa · s, 20° C.]: | 99 |
| BCH-3F.F.F | 8.0% | LTS [bulk, −25° C.]: | >1000 h |
| APUQU-2-F | 7.0% | $V_{10}$ [V]: | 1.05 |
| APUQU-3-F | 8.0% | | |
| PGUQU-3-F | 4.0% | | |
| PGUQU-4-F | 6.0% | | |
| PGUQU-5-F | 6.0% | | |
| DPGU-4-F | 8.0% | | |

Example M7

| | | | |
|---|---|---|---|
| APUQU-2-F | 5.0% | Clearing point [° C.]: | 74.5 |
| APUQU-3-F | 6.0% | Δn [589 nm, 20° C.]: | 0.1345 |
| BCH-3F.F.F | 2.0% | Δε [1 kHz, 20° C.]: | 13.8 |
| CC-3-V | 31.5% | | |
| CC-3-V1 | 5.0% | | |
| CCP-3-3 | 1.0% | | |
| CCP-V-1 | 3.0% | | |
| CPU-3-OXF | 5.0% | | |
| PGP-2-2V | 10.5% | | |
| PGU-2-F | 6.0% | | |
| PGUQU-3-F | 7.0% | | |
| PGUQU-4-F | 3.0% | | |
| PGUQU-5-F | 3.0% | | |
| PPGU-3-F | 1.0% | | |
| PUQU-3-F | 11.0% | | |

Example M8

| | | | |
|---|---|---|---|
| CC-3-V | 22.0% | Clearing point [° C.]: | 79.5 |
| CCP-1F.F.F | 3.0% | Δn [589 nm, 20° C.]: | 0.1294 |
| CCP-2F.F.F | 9.0% | Δε [1 kHz, 20° C.]: | 20.2 |
| CCP-3F.F.F | 9.0% | γ₁ [mPa · s, 20° C.]: | 129 |
| CPU-3-OXF | 12.0% | LTS [bulk, −25° C.]: | >1000 h |
| PGU-2-F | 3.0% | $V_{10}$ [V]: | 1.05 |
| PGU-3-F | 6.0% | | |
| APUQU-2-F | 7.0% | | |
| APUQU-3-F | 7.0% | | |
| PGUQU-3-F | 4.0% | | |
| PGUQU-4-F | 5.0% | | |
| PGUQU-5-F | 6.0% | | |
| DPGU-4-F | 7.0% | | |

Example M9

| | | | |
|---|---|---|---|
| CC-3-V | 37.0% | Clearing point [° C.]: | 77.5 |
| PUQU-3-F | 14.0% | Δn [589 nm, 20° C.]: | 0.1372 |
| APUQU-2-F | 4.0% | Δε [1 kHz, 20° C.]: | 12.8 |
| APUQU-3-F | 5.0% | γ₁ [mPa · s, 20° C.]: | 82 |
| PGP-1-2V | 6.0% | LTS [bulk, −25° C.]: | >1000 h |
| PGP-2-2V | 6.0% | $V_{10}$ [V]: | 1.24 |
| PGP-3-2V | 6.0% | | |
| CCP-V2-1 | 5.0% | | |
| PGUQU-3-F | 7.0% | | |
| PGUQU-4-F | 5.0% | | |
| PGUQU-5-F | 5.0% | | |

Example M10

| | | | |
|---|---|---|---|
| APUQU-2-F | 6.0% | Clearing point [° C.]: | 75.0 |
| APUQU-3-F | 12.0% | Δn [589 nm, 20° C.]: | 0.1268 |
| PGUQU-3-F | 8.0% | Δε [1 kHz, 20° C.]: | 14.4 |
| PGUQU-4-F | 10.0% | γ₁ [mPa · s, 20° C.]: | 78 |
| PGUQU-5-F | 8.0% | $V_0$ [V]: | 0.99 |
| PGP-2-2V | 5.0% | | |
| CC-3-V | 42.0% | | |
| CC-3-V1 | 3.0% | | |
| PP-1-2V1 | 6.0% | | |

Example M11

| | | | |
|---|---|---|---|
| APUQU-2-F | 10.0% | Clearing point [° C.]: | 76.5 |
| APUQU-3-F | 10.0% | Δn [589 nm, 20° C.]: | 0.1183 |
| PGUQU-3-F | 8.0% | Δε [1 kHz, 20° C.]: | 14.0 |
| PGUQU-4-F | 8.0% | $V_0$ [V]: | 0.95 |
| PGUQU-5-F | 8.0% | | |
| CC-3-V | 50.0% | | |
| PGP-2-2V | 6.0% | | |

Example M12

| | | | |
|---|---|---|---|
| CC-3-V | 33.0% | Clearing point [° C.]: | 93.5 |
| CC-3-V1 | 12.0% | Δn [589 nm, 20° C.]: | 0.1086 |
| CCP-V2-1 | 6.0% | Δε [1 kHz, 20° C.]: | 13.7 |
| CCP-3OCF3 | 6.0% | γ₁ [mPa · s, 20° C.]: | 92 |
| CCQU-3-F | 4.0% | $V_0$ [V]: | 1.09 |
| APUQU-2-F | 10.0% | | |
| APUQU-3-F | 10.0% | | |
| PGUQU-3-F | 5.0% | | |
| PGUQU-4-F | 8.0% | | |
| DPGU-4-F | 6.0% | | |

Example M13

| | | | |
|---|---|---|---|
| CC-3-V | 32.0% | Clearing point [° C.]: | 96.0 |
| CC-3-V1 | 12.0% | Δn [589 nm, 20° C.]: | 0.1092 |
| CCP-V2-1 | 9.0% | Δε [1 kHz, 20° C.]: | 15.0 |
| CCGU-3-F | 4.0% | γ₁ [mPa · s, 20° C.]: | 108 |
| APUQU-2-F | 9.0% | $V_0$ [V]: | 1.03 |
| APUQU-3-F | 9.0% | | |
| PGUQU-3-F | 6.0% | | |

-continued

| | |
|---|---|
| PGUQU-4-F | 6.0% |
| PGUQU-5-F | 4.0% |
| CDUQU-3-F | 9.0% |

Example M14

| | | | |
|---|---|---|---|
| CC-3-V | 31.0% | Clearing point [° C.]: | 96.0 |
| CC-3-V1 | 12.0% | Δn [589 nm, 20° C.]: | 0.1087 |
| CCP-V2-1 | 5.0% | Δε [1 kHz, 20° C.]: | 15.2 |
| CCGU-3-F | 3.0% | γ$_1$ [mPa · s, 20° C.]: | 106 |
| CCQU-3-F | 11.0% | V$_0$ [V]: | 1.03 |
| APUQU-2-F | 10.0% | | |
| APUQU-3-F | 10.0% | | |
| PGUQU-3-F | 5.0% | | |
| PGUQU-4-F | 6.0% | | |
| DPGU-4-F | 7.0% | | |

The invention claimed is:

1. A liquid-crystalline medium, comprising:
at least two compounds of the formula IA,

IA

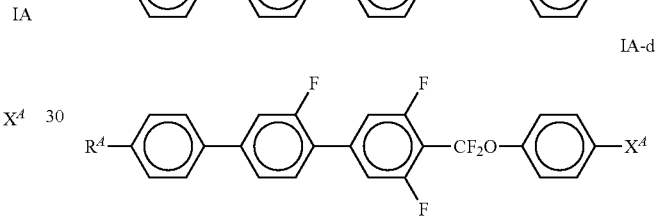

and at least two compounds of the formula IB,

IB

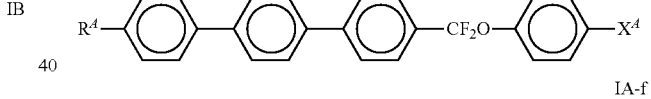

wherein the combined total concentration of all compounds of formula IA and IB in the liquid crystalline medium is 30% by weight or more, and $R^A$ and $R^B$ each, independently of one another, denote a halogenated or un-substituted alkyl or alkoxy radical having 1 to 15 C atoms, where, in addition, one or more CH$_2$ groups in these radicals may each be replaced, independently of one another, by —C≡C—, —CF$_2$O—, —CH=CH—,

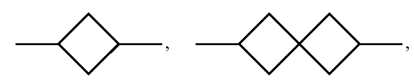

—O—, —CO—O— or —O—CO— in such a way that O atoms are not linked directly to one another, $X^A$ and $X^B$ each, independently of one another, denote F, Cl, CN, SF$_5$, SCN, NCS, a halogenated alkyl radical, a halogenated alkenyl radical, a halogenated alkoxy radical or a halogenated alkenyloxy radical, each having up to 6 C atoms, and $Y^{1-13}$ each, independently of one another, denote H or F.

2. Liquid-crystalline medium according to claim 1, characterised in that it comprises one or more compounds selected from the compounds of the formulae IA-a to IA-f, IA-a

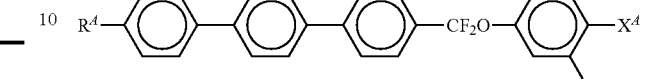

IA-b

IA-c

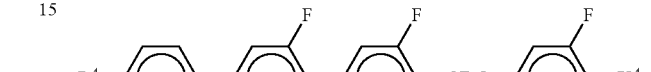

IA-d

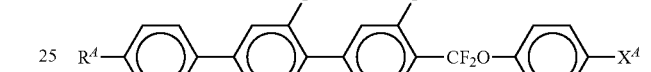

IA-e

IA-f

in which $R^A$ and $X^A$ have the meanings indicated in claim 1.

3. Liquid-crystalline medium according to claim 1, characterised in that it comprises one or more compounds selected from the compounds of the formulae IB-a to IB-h IB-a

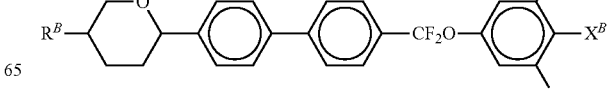

-continued

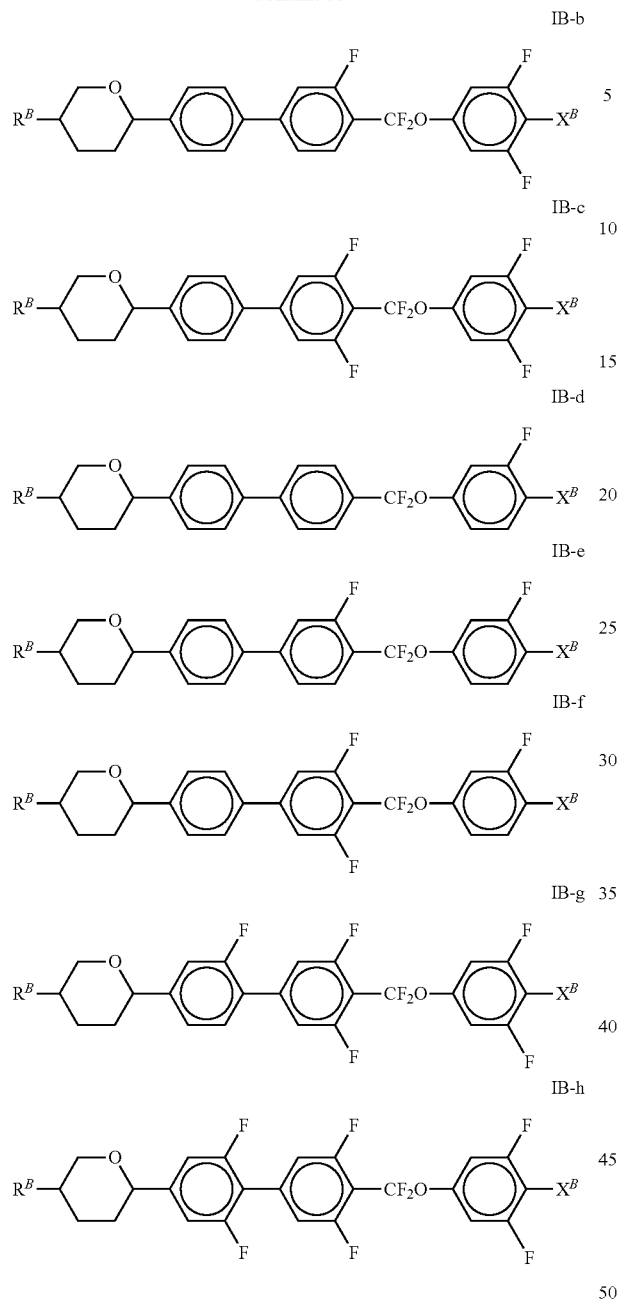

in which $R^B$ and $X^B$ have the meanings indicated in claim 1.

4. Liquid-crystalline medium according to claim 1, characterised in that it additionally comprises one or more compounds selected from the formulae II and/or III,

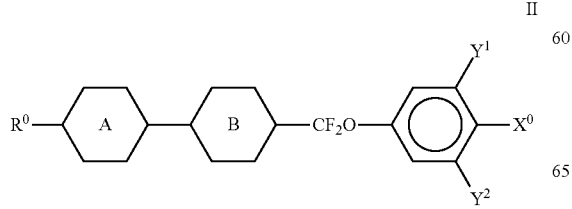

-continued

in which $R^0$ denotes a halogenated or unsubstituted alkyl or alkoxy radical having 1 to 15 C atoms, where, in addition, one or more $CH_2$ groups in these radicals may each be replaced, independently of one another, by —C≡C—, —$CF_2$O—, —CH=CH—,

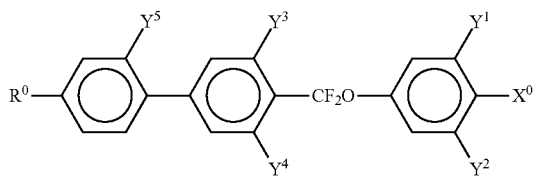

—O—, —CO—O— or —O—CO— in such a way that O atoms are not linked directly to one another, $X^0$ denotes F, Cl, CN, $SF_5$, SCN, NCS, a halogenated alkyl radical, a halogenated alkenyl radical, a halogenated alkoxy radical or a halogenated alkenyloxy radical, each having up to 6 C atoms, and $Y^{1\text{-}5}$ each, independently of one another, denote H or F,

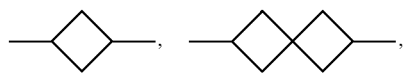

each, independently of one another, denote

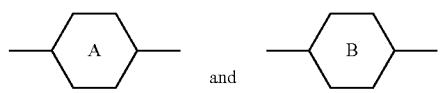

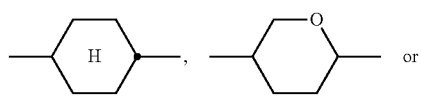

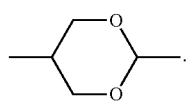

5. Liquid-crystalline medium according to claim 1, characterised in that it additionally comprises one or more compounds selected from the formulae IV to VIII,

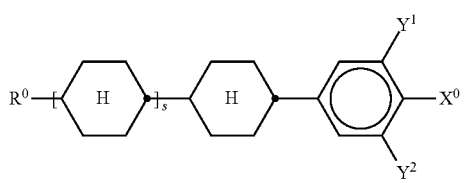

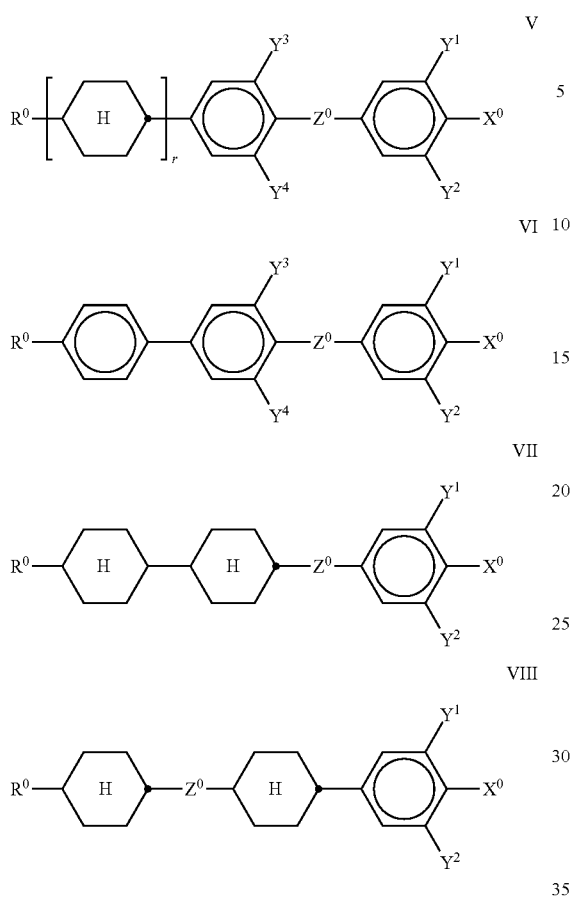

in which $Y^{1-4}$ have the meanings indicated in claim 1, $R^0$ denotes a halogenated or unsubstituted alkyl or alkoxy radical having 1 to 15 C atoms, where, in addition, one or more $CH_2$ groups in these radicals may each be replaced, independently of one another, by —C≡C—, —CF$_2$O—, —CH=CH—,

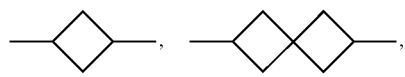

—O—, —CO—O— or —O—CO— in such a way that O atoms are not linked directly to one another and $X^0$ denotes F, Cl, CN, SF$_5$, SCN, NCS, a halogenated alkyl radical, a halogenated alkenyl radical, a halogenated alkoxy radical or a halogenated alkenyloxy radical, each having up to 6 C atoms, $Z^0$ denotes —C$_2$H$_4$—, —(CH$_2$)$_4$—, —CH=CH—, —CF=CF—, —CH$_2$CF$_2$—, —CF$_2$CH$_2$—, —CH$_2$O—, —OCH$_2$—, —COO— or —OCF$_2$—, in formulae V and VI also a single bond, in formulae V and VIII also —CF$_2$O—, r denotes 0 or 1, and s denotes 0 or 1.

6. Liquid-crystalline medium according to claim 1, characterised in that it additionally comprises one or more compounds selected from the formulae IX to XII, in which $X^0$ denotes F, Cl, CN, SF$_5$, SCN, NCS, a halogenated alkyl radical, a halogenated alkenyl radical, a halogenated alkoxy radical or a halogenated alkenyloxy radical, each having up to 6 C atoms and L denotes H or F, "alkyl" denotes $C_{1-6}$-alkyl, R' denotes $C_{1-6}$-alkyl, $C_{1-6}$-alkoxy or $C_{2-6}$-alkenyl, and "alkenyl" and "alkenyl*" each, independently of one another, denote $C_{2-6}$-alkenyl.

7. Liquid-crystalline medium according to claim 1, characterised in that it additionally comprises one or more compounds of the formula XIII, in which $R^1$ and $R^2$ each, independently of one another, denote n-alkyl, alkoxy, oxaalkyl, fluoroalkyl or alkenyl, each having up to 6 C atoms, where at least one of the radicals $R^1$ and $R^2$ denotes alkenyl having 2 to 6 C atoms.

8. Liquid-crystalline medium according to claim 1, characterised in that it additionally comprises one or more compounds of the formula XVII, in which $R^1$ and $R^2$ each, independently of one another, denote n-alkyl, alkoxy, oxaalkyl, fluoroalkyl or alkenyl, each having up to 8 C atoms, and L denotes H or F.

9. Liquid-crystalline medium according to claim 1, characterised in that it comprises one or more compounds selected from the group of the compounds of the formulae XXVII, XXVIII and XXIX,

XXVII

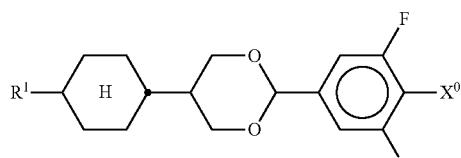

XXVIII

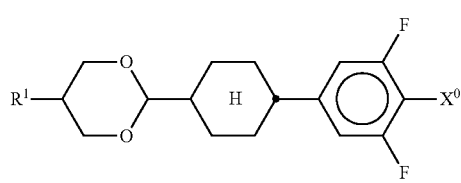

XXIX

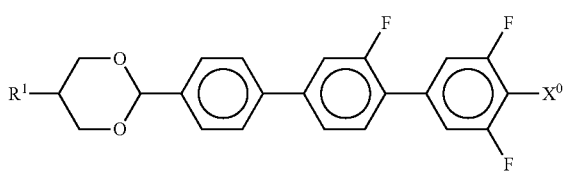

in which R¹ denotes a halogenated or unsubstituted alkyl or alkoxy radical having 1 to 15 C atoms, where, in addition, one or more CH$_2$ groups in these radicals may each be replaced, independently of one another, by —C≡C—, —CF$_2$O—, —CH=CH—,

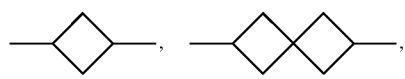

—O—, —CO—O— or —O—CO— in such a way that O atoms are not linked directly to one another and X° denotes F, Cl, CN, SF$_5$, SCN, NCS, a halogenated alkyl radical, a halogenated alkenyl radical, a halogenated alkoxy radical or a halogenated alkenyloxy radical, each having up to 6 C atoms.

10. Liquid-crystalline medium according to claim 1, characterised in that it comprises one or more compounds selected from the group of the compounds of the formulae XIX, XX, XXI, XXII, XXIII and XXIV,

XIX

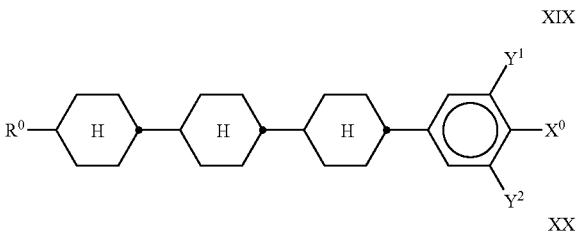

XX

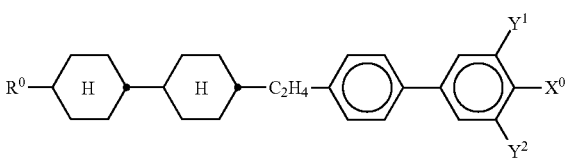

XXI

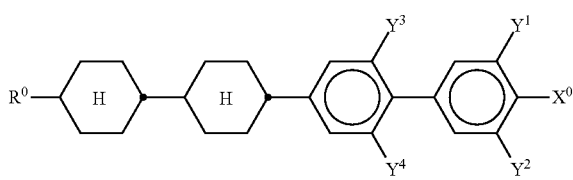

XXII

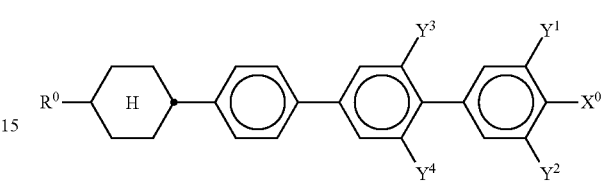

XXIII

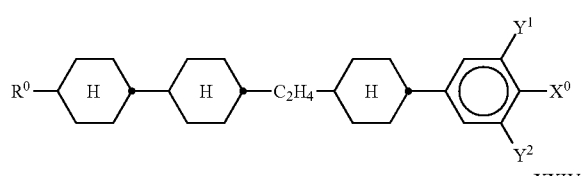

XXIV

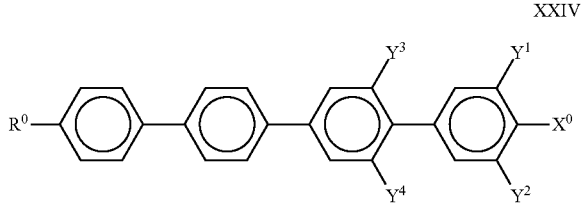

in which R⁰ denotes a halogenated or unsubstituted alkyl or alkoxy radical having 1 to 15 C atoms, where, in addition, one or more CH$_2$ groups in these radicals may each be replaced, independently of one another, by —C≡C—, —CF$_2$O—, —CH=CH—,

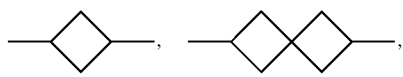

—O—, —CO—O— or —O—CO— in such a way that O atoms are not linked directly to one another and X⁰ denotes F, Cl, CN, SF$_5$, SCN, NCS, a halogenated alkyl radical, a halogenated alkenyl radical, a halogenated alkoxy radical or a halogenated alkenyloxy radical, each having up to 6 C atoms, and Y$^{1-4}$ each, independently of one another, denote H or F.

11. Liquid-crystalline medium according to claim 1, characterised in that it additionally comprises ≥20% by weight of the compound of the formula DO, IXb

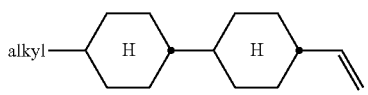

in which alkyl denotes C$_{1-6}$-alkyl.

12. Liquid-crystalline medium according to claim 1, characterised in that it additionally comprises one or more additive(s) selected from the group of the UV stabilisers, dopants and antioxidants.

13. Liquid-crystalline medium according to claim 1, characterised in that it additionally comprises one or more polymerisable compounds.

14. Process for the preparation of a liquid-crystalline medium according to claim 4, characterised in that one or more compounds of the formula IA and one or more compounds of the formula IB, are mixed with one or more compounds of formula II and/or one or more compounds of formula III and optionally also with one or more additives and/or at least one polymerisable compound.

15. A method which comprises using a liquid-crystalline medium according to claim 1 for electro-optical purposes.

16. A method according to claim 15 which comprises using said liquid-crystalline medium in shutter glasses, for 3D applications, in TN, PS-TN, STN, TN-TFT, OCB, IPS, PS-IPS, FFS, PS—FFS and PS-VA-IPS displays.

17. Electro-optical liquid-crystal display containing a liquid-crystalline medium according to claim 1.

18. Liquid-crystalline medium according to claim 11, characterised in that it additionally comprises ≥24% by weight of compounds of the formula IXb.

19. Liquid-crystalline medium according to claim 18, characterised in that it additionally comprises ≥24% by weight of compounds of the formula IXb-1

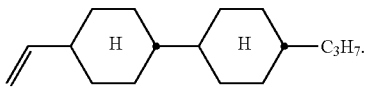

IXb-1

20. Liquid-crystalline medium according to claim 1, characterised in that it additionally comprises ≥30% by weight of compounds of the formula IXb-1

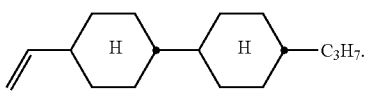

IXb-1

* * * * *